US012683918B1

(12) United States Patent
Woods et al.

(10) Patent No.: US 12,683,918 B1
(45) Date of Patent: Jul. 14, 2026

(54) APPARATUS AND METHOD FOR GENERATING CONTEXT-AWARE DEVICE PROMPTS AND TRANSMISSION PROTOCOLS

(71) Applicant: AI Leadership Labs, LLC, Austin, TX (US)

(72) Inventors: Geoff Woods, Austin, TX (US); Randall Joseph Ottinger, Bellevue, WA (US)

(73) Assignee: AI Leadership Labs, LLC, Austin, TX (US)

( * ) Notice: Subject to any disclaimer, the term of this patent is extended or adjusted under 35 U.S.C. 154(b) by 0 days.

(21) Appl. No.: 19/305,258

(22) Filed: Aug. 20, 2025

(51) Int. Cl.
H04L 51/043 (2022.01)
G06F 40/40 (2020.01)

(52) U.S. Cl.
CPC ............ H04L 51/043 (2013.01); G06F 40/40 (2020.01)

(58) Field of Classification Search
CPC ...... G06N 20/00; G06N 3/045; G06N 3/0464; G06N 3/09
See application file for complete search history.

(56) References Cited

U.S. PATENT DOCUMENTS

| | | | | |
|---|---|---|---|---|
| 11,151,992 B2 * | 10/2021 | Cui | ...................... | G06V 40/161 |
| 12,197,859 B1 * | 1/2025 | Malviya | ............... | G06F 40/216 |
| 2019/0213465 A1 | 7/2019 | Avrahami et al. | | |
| 2021/0174095 A1 * | 6/2021 | Kong | ...................... | G06F 3/167 |
| 2023/0409615 A1 * | 12/2023 | Khemka | ............... | G06V 20/68 |
| 2024/0329942 A1 * | 10/2024 | Saxena | ................... | G06F 40/20 |

FOREIGN PATENT DOCUMENTS

| | | | | |
|---|---|---|---|---|
| CN | 119598205 B | * 5/2025 | ........... | G06F 40/211 |
| GB | 2358722 A | 8/2001 | | |
| IN | 202441091788 A | 11/2024 | | |
| IN | 202541011445 A | 2/2025 | | |

* cited by examiner

*Primary Examiner* — Chirag R Patel
(74) *Attorney, Agent, or Firm* — Caldwell LLC

(57) ABSTRACT

An apparatus and method for generating context-aware device prompts and transmission protocols are disclosed. The apparatus including at least a processor, and a memory communicatively connected to the at least a processor, wherein the memory contains instructions configuring the at least a processor to receive a user profile associated with at least a user and a user input, determine one or more contextual signals as a function of the user profile and the user input, generate a device prompt as a function of the one or more contextual signals, and transmit the device prompt to a downstream device through a first communication channel, wherein transmitting the device prompt includes detecting a device responsiveness of the downstream device, and modifying at least a transmittal parameter as a function of the device responsiveness.

18 Claims, 9 Drawing Sheets

805 Receiving a User Profile and a User Input

810 Determining One or More Contextual Signals

815 Generating a Device Prompt

820 Transmitting the Device Prompt

800

APPARATUS AND METHOD FOR GENERATING CONTEXT-AWARE DEVICE PROMPTS AND TRANSMISSION PROTOCOLS

FIELD OF THE INVENTION

The present invention generally relates to the field of prompt generation. In particular, the present invention is directed to an apparatus and method for generating context-aware device prompts and transmission protocols.

BACKGROUND

Current approaches to device prompt generation have typically relied on static user profiles combined with pre-defined input-output mappings. These systems generally use rule-based logic to trigger notifications or reminders at fixed intervals or in response to isolated user actions, without accounting for changing user context, behavioral variability, or strategic alignment across time. As a result, such systems are limited in their ability to adapt prompt delivery to real-world conditions that affect responsiveness. Accordingly, there is a need for an adaptive prompting system that goes beyond static scheduling and rule-based logic.

SUMMARY OF THE DISCLOSURE

In some aspects, the techniques described herein relate to an apparatus for generating context-aware device prompts and transmission protocols, the apparatus including at least a processor, and a memory communicatively connected to the at least a processor, wherein the memory contains instructions configuring the at least a processor to receive a user profile associated with at least a user and a user input, wherein receiving the user profile and the user input includes receiving the user profile at a first interval from a first data source and receiving the user input at a second interval from a second data source, determine one or more contextual signals as a function of the user profile and the user input, generate a device prompt as a function of the one or more contextual signals, and transmit the device prompt to a downstream device through a first communication channel, wherein transmitting the device prompt includes detecting a device responsiveness of the downstream device, and modifying at least a transmittal parameter as a function of the device responsiveness.

In some aspects, the techniques described herein relate to a method for generating context-aware device prompts and transmission protocols, the method including receiving, using at least a processor, a user profile associated with at least a user and a user input, wherein receiving the user profile and the user input includes receiving the user profile at a first interval from a first data source and receiving the user input at a second interval from a second data source, determining, using the at least a processor, one or more contextual signals as a function of the user profile and the user input, generating, using the at least a processor, a device prompt as a function of the one or more contextual signals, and transmitting, using the at least a processor, the device prompt to a downstream device through a first communication channel, wherein transmitting the device prompt includes detecting a device responsiveness of the downstream device, and modifying at least a transmittal parameter as a function of the device responsiveness.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for A. In some aspects, the techniques described herein relate to an apparatus for generating context-aware device prompts and transmission protocols, the apparatus including at least a processor, and a memory communicatively connected to the at least a processor, wherein the memory contains instructions configuring the at least a processor to receive a user profile associated with at least a user and a user input, wherein receiving the user profile and the user input includes receiving the user profile at a first interval from a first data source and receiving the user input at a second interval from a second data source, determine one or more contextual signals as a function of the user profile and the user input, generate a device prompt as a function of the one or more contextual signals, and transmit the device prompt to a downstream device through a first communication channel, wherein transmitting the device prompt includes detecting a device responsiveness of the downstream device, and modifying at least a transmittal parameter as a function of the device responsiveness.

Aspects of the present disclosure allow for intelligent, personalized delivery of prompts. Exemplary embodiments illustrating aspects of the present disclosure are described below in the context of several specific examples.

Figure 1:
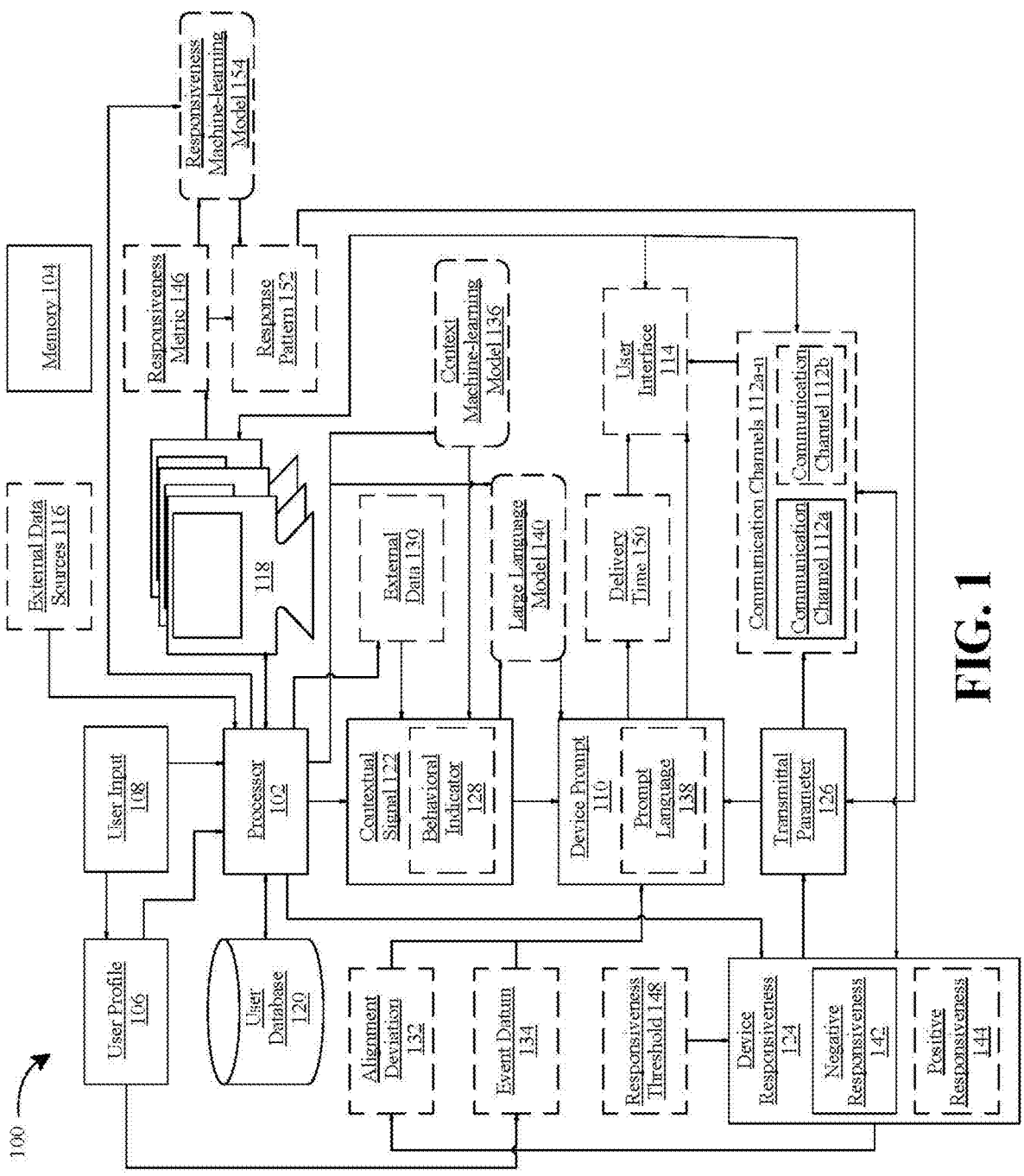
FIG. 1 illustrates a block diagram of an exemplary apparatus for generating context-aware device prompts and transmission protocols.

Referring now to FIG. 1, an exemplary embodiment of apparatus 100 for generating context-aware device prompts and transmission protocols is illustrated. Apparatus 100 may include circuitry such as without limitation a processor 102 communicatively connected to a memory 104; for instance, circuitry may include and/or be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 104 contains instructions configuring processor 102 to receive a user profile 106 associated with at least a user and a user input 108. For the purposes of this disclosure, a "user profile" is a data object associated with a user or a job of a user. In some cases, user profile 106 may include static and/or dynamic user-specific information. As a non-limiting example, user profile 106 may include personality model parameters (e.g., Dominance, Influence, Steadiness, and Conscientiousness [DISC], Kolbe, or similar psychometric indicators), preferred communication styles, prompt timing preferences, role-specific metadata, historical interaction patterns, engagement metrics, cadence settings, behavioral response data, and persona selection attributes. In some embodiments, user profile 106 may include contextual role data, performance metrics such as key performance indicators (KPIs), user goal, and historical responsiveness. A "user goal," as used herein, is a task or an objective that a user would like to achieve. As a non-limiting example, a user goal may include completing a specific project milestone, preparing for an upcoming meeting, improving team alignment, reaching a predefined key performance indicator (KPI), increasing personal productivity, acquiring a new skill, responding to stakeholder feedback, or making progress on a strategic initiative. In some embodiments, a user goal may include one or more team goals or company goals to which a user is explicitly or implicitly accountable. In some cases, team goals may include objectives shared among multiple users. As a non-limiting example, team goals may include collaborative deliverables, cross-functional initiatives, or interdependent performance targets. In some cases, company goals may include high-level strategic outcomes, such as revenue growth, market expansion, regulatory compliance, or cultural transformation efforts. In some embodiments, user goals may be explicitly defined by the user through input interfaces, inferred from user behavior or calendar entries, or derived from role-specific responsibilities stored in the user profile. In some cases, user profile 106 may be continuously updated based on user input 108, system monitoring, or integration with external systems.

Still referring to FIG. 1, in some embodiments, user profile 106 may include data regarding a corporation or section of a market. For example, as a non-limiting example, user profile 106 may include data regarding the company that a user works at. For example, as non-limiting example, the user profile 106 may include data regarding a market segment, such as "manufacturing," or "AI," or "rubber." In some embodiments, user profile 106 may include data scraped from the internet using a web crawler. In some embodiments, user profile 106 may include data received through an Application Programming Interface (API) such as, as non-limiting example, a stock price API, a commodities API, a news API, a weather API, a jobs data API, and the like.

Still referring to FIG. 1, in some cases, user profile 106 may include preferred persona. For the purposes of this disclosure, a "preferred persona" is a configurable communication archetype selected by or associated with a user. In some cases, preferred persona may define tone, style, and rhetorical characteristics. In some cases, preferred persona may represent a fictional or role-based identity that aligns with the user's motivational style, leadership orientation, or cognitive preferences. For example, and without limitation, preferred persona may include "visionary founder," "no-nonsense COO," or "future self." In some cases, processor 102 may determine or construct preferred persona using inputs (e.g., user profile 106 or user input 108) from personality models (e.g., DISC, Kolbe), user-selected attributes, historical interaction data, or predefined persona templates. In some cases, user may manually input preferred persona.

Still referring to FIG. 1, for the purposes of this disclosure, a "user input" is any data or signal originating from a user. In some embodiments, user input 108 may include responses to device prompts 110, explicit configuration selections, and the like. In some cases, user input 108 may include textual responses, audio responses, visual responses, gestural responses, and the like. Audio responses may include spoken feedback or verbal confirmations captured through a microphone and transcribed using speech recognition technologies. Visual responses may include facial expressions, gaze direction, or physical gestures detected through a camera or sensor interface. Textual responses may include typed input, selections from predefined options, or freeform written feedback entered through a user interface. User input 108 may include a video recording of a user speaking. Gestural interactions may include hand movements, touchscreen gestures, or other physical actions that convey intent or acknowledgment. In some embodiments, user input 108 may include indirect signals such as interaction frequency, sentiment or tone extracted from natural language or audio responses, calendar data, or responsiveness patterns inferred from latency in reply or absence of engagement. In some cases, user input 108 may include cadence preferences, timing constraints, feedback regarding prompt effectiveness, acknowledgments, behavioral indicators such as prompt dismissal or delay, and adjustments to communication channels 112*a-n* or personas. In some cases, user input 108 may be received actively through direct interaction with a user interface 114. In some cases, user input 108 may be received passively through system monitoring of user behavior across integrated platforms or external data sources 116.

Still referring to FIG. 1, for the purposes of this disclosure, a "user" is an individual or entity who interacts with an apparatus 100. In some cases, user may be associated with a specific identity within an organizational or individual setting. In some cases, user may provide inputs that include user profile 106, preferences, and behavioral signals or user inputs 108. For example, and without limitation, user may include a worker, team leader, executive, or other stakeholder. In some cases, processor 102 may receive user profile 106 and/or user input 108 associated with or from a single user. In some cases, processor 102 may receive user profile 106 and/or user input 108 associated with or from multiple users. In a non-limiting example, processor 102 may receive user input 108 from members of a project team collaborating on a shared initiative.

With continued reference to FIG. 1, in some embodiments, processor 102 may receive user profile 106 and/or user input 108 from a downstream device 118. For the purposes of this disclosure, a "downstream device" is a device, system or endpoint capable of receiving data transmitted by a processor 102. As a non-limiting example, downstream device 118 may include smartphones, tablets, desktop computers, laptop computers, smartwatches, messaging clients, calendar interfaces, or any endpoint system. In some cases, downstream device 118 may include a user device. For the purposes of this disclosure, a "user device" is any device a user use to input data. As a non-limiting example, user device may include a laptop, desktop, tablet, mobile phone, smart phone, smart watch, kiosk, screen, smart headset, or things of the like. In some embodiments, user device may include an interface configured to receive inputs from a user. In some embodiments, a user may manually input any data into apparatus 100 using user device. In some embodiments, a user may have a capability to process, store or transmit any information independently.

With continued reference to FIG. 1, in some embodiments, processor 102 may receive user profile 106 and/or user input 108 from a user database 120. As used in this disclosure, a "user database" is a data structure configured to store data associated with a user. As a non-limiting example, user database 120 may store user profile 106, user input 108, contextual signals 122, device prompt 110, device responsiveness 124, transmittal parameter 126, behavior indicator 128, external data 130, alignment deviation 132, event datum 134, and the like. In one or more embodiments, user database 120 may include inputted or calculated information and datum related to a user or user profile 106. In some embodiments, a datum history may be stored in user database 120. As a non-limiting example, the datum history may include real-time and/or previous inputted data related to a user or user profile 106. As a non-limiting example, user database 120 may include instructions from a user, who may be an expert user, a past user in embodiments disclosed herein, or the like, where the instructions may include examples of the data related to user or user profile 106.

With continued reference to FIG. 1, in some embodiments, processor 102 may be communicatively connected with user database 120. For example, and without limitation, in some cases, user database 120 may be local to processor 102. In another example, and without limitation, user database 120 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor connects directly, dynamically, and non-hierarchically to as many other computing devices as possible. A "network topology" as used in this disclosure is an arrangement of elements of a communication network.

With continued reference to FIG. 1, in some embodiments, user database 120 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, processor 102 may be configured to retrieve user profile 106 and/or user input 108 from an application programming interface (API). As used herein, an "application programming interface" is a set of functions that allow applications to access data and interact with external software components, operating systems, or microdevices.

With continued reference to FIG. 1, receiving user profile 106 and user input 108 includes receiving the user profile 106 at a first interval from a first data source and receiving the user input 108 at a second interval from a second data source. In some embodiments, receiving user profile 106 at a first interval from a first data source may include obtaining relatively static or infrequently updated information, such as a user's role, team assignment, communication preferences, personality attributes, or cadence settings, from a persistent enterprise system or user configuration service. As a non-limiting example, receiving user profile 106 at a first interval from a first data source may occur periodically (e.g., daily, weekly, or at login). As a non-limiting example, receiving user profile 106 at a first interval from a first data source may occur in response to an event such as user onboarding, a system update, or explicit user input. An "interval" indicates that data is received at a specific time or according to a pre-defined schedule. In some cases, receiving user input 108 at a second interval from a second data source may indicate that receiving typed responses, voice input, gesture commands, or reaction signals to device prompts, through interfaces such as mobile apps, desktop clients, or speech recognition systems. In some cases, second interval may be shorter than first interval. In some cases, second interval may be event-driven, occurring in real time or near-real time, based on user actions or system polling logic. For example, and without limitation, user profile 106 may be received from a backend identity management service, while user input 108 may originate from a front-end mobile application, voice assistant, or text interface. For example, and without limitation, receiving user profile 106 at a first interval from a first data source may include accessing a cloud-based user management service once per day to retrieve a user's current role ("Product Manager"), preferred prompt tone ("visionary coach"), and assessment results from a personality diagnostic tool (e.g., DISC profile indicating a dominance-influence type). For example, and without limitation, receiving a user input 108 at a second interval from a second data source may occur in real time as a user types a response into a prompt interface or speaks into a microphone connected to a mobile app For example, and without limitation, if a user receives a prompt asking, "What are the blockers for your next milestone?" and replies via text input ten minutes later, that input may be captured from a different source (e.g., the mobile app or a browser-based interface) and at a different time (the second interval) from when the user profile was previously loaded.

With continued reference to FIG. 1, in some embodiments, at least a processor 102 may analyze document to find user profile 106 and/or user input 108 using optical character recognition (OCR). As a non-limiting example, document may include a scanned image, PDF file, printed form, handwritten note, meeting agenda, physical worksheet, or the like. In some cases, processor 102 may process extracted content to identify user profile 106 such as stated goals, role descriptions, scheduling preferences, communication styles, or the like. In some embodiments, at least a processor 102 may analyze user profile 106 and/or user input 108 to find keywords using OCR. As a non-limiting example, the extracted keywords may include goal-related terms, role identifiers, behavioral descriptors, scheduling cues, or contextual references relevant to the user's intent or organizational environment. In some embodiments, keyword extraction may further support classification, prioritization, or persona adaptation functions. For the purposes of this disclosure, "optical character recognition" is a technology that enables the recognition and conversion of printed or written text into machine-encoded text. In some cases, the at least a processor 102 may be configured to recognize a keyword using the OCR to find keywords. As used in this disclosure, a "keyword" is an element of word or syntax used to identify and/or match elements to each other. In some cases, the at least a processor 102 may transcribe much or even substantially all document, user profile 106 and/or user input 108.

With continued reference to FIG. 1, in some embodiments, optical character recognition or optical character reader (OCR) may include automatic conversion of images of written (e.g., typed, handwritten or printed text) text into machine-encoded text. In some cases, recognition of a keyword from document, user profile 106 and/or user input 108 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of document, user profile 106 and/or user input 108. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the user profile 106 and/or user input 108 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 3. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes user profile 106 and/or user input 108. Since the adaptive classifier may have learned something useful a little too late to recognize characters on the first pass, a second pass may be run over the user profile 106 and/or user input 108. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, user profile 106 and/or user input 108 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 102 may generate web crawler to scrape user profile 106 and/or user input 108 from user's website. The web crawler may be seeded and/or trained with a reputable website to begin the search. Web crawler may be generated by processor 102. In some embodiments, web crawler may be trained with information received from user through a user interface 114. In some embodiments, web crawler may be configured to generate a web query. A web query may include search criteria received from user. For example, user may submit a plurality of websites for web crawler to search to user profile 106 and/or user input 108. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 102, received from a machine learning model, and/or received from user. In some embodiments, a relevancy score may include a range of numerical values that may correspond to a relevancy strength of data received from a web crawler function. As a non-limiting example, a web crawler function may search the Internet for user profile 106 and/or user input 108 related to user.

With continued reference to FIG. 1, memory 104 contains instructions configuring processor 102 to determine one or more contextual signals 122 as a function of user profile 106 and user input 108. For the purposes of this disclosure, a "contextual signal" is any data point, event, condition, or variable that characterizes a situational context surrounding a user. As a non-limiting example, contextual signals 122 may include a change in a user's role or responsibilities, missed milestones, KPI deviations, engagement anomalies, sentiment shifts, team alignment variances (e.g., alignment deviation 132), missed performance targets, meeting patterns, energy cycles, sentiment shifts, emerging conflicts between personal, team, or company goals, calendar conflicts, time-zone transitions, or external market or regulatory events. In some cases, processor 102 may analyze data contained in or derived from a user profile 106, such as personality traits, communication preferences, role metadata, responsiveness history, or performance indicators, and may combine that with data from user input 108, which may include real-time responses, behavior patterns, or interaction signals. The processor 102 may extract or infer contextual signals 122 that reflect the user's current situation, needs, or state of alignment. In some cases, user may manually input contextual signal 122.

With continued reference to FIG. 1, in some cases, determining one or more contextual signals 122 may include extracting one or more user features as a function of a user profile 106 and a user input 108 using a convolutional neural network (CNN) and determining one or more behavioral indicators 128 of the one or more contextual signals 122 as a function of the one or more user features. For the purposes of this disclosure, a "user feature" is a characteristic, trait, pattern, or condition derived from a user profile or user input. In some embodiments, user features may include latent vectors, scalar values, categorical identifiers, or embedding representations that encode information about user behavior, preferences, communication patterns, engagement tendencies, emotional tone, or strategic intent.

With continued reference to FIG. 1, a "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., user profile 106, user input 108, and the like through a sliding window approach. In some cases, convolution operations may enable processor 104 to detect local/global patterns, edges, textures, and any other features described herein within user profile 106, user input 108, and the like. User profile 106, user input 108, and the like may be passed through one or more activation functions, such as without limitation, Rectified Linear Unit (ReLU), to introduce nonlinearities into the processing step. Additionally, or alternatively, CNN may also include one or more pooling layers, wherein each pooling layer is configured to reduce the dimensionality of input data while preserving essential features within the input data.

Still referring to FIG. 1, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, user features. Further, each fully connected layer may be followed by one or more dropout layers configured to prevent overfitting, and one or more normalization layers to stabilize the learning process described herein.

With continued reference to FIG. 1, for the purposes of this disclosure, a "behavioral indicator" is a signal or pattern derived from a user's actions, inactions, or interaction history that reflects the user's cognitive state, engagement level, working habits, or deviations from expected behavior. As a non-limiting example, behavioral indicators 128 may include response latency to prompts, frequency of prompt dismissals, changes in communication tone or sentiment, repeated procrastination patterns, absence of scheduled focus blocks, inconsistent calendar behavior, reduced interaction with collaborative tools, or deviation from established work rhythms.

With continued reference to FIG. 1, in some cases, processor 102 may include audiovisual speech recognition (AVSR) processes to recognize keyword, behavior indicators 128 and/or contextual signals 122 in video recording or user input 108. For example, and without limitation, processor 102 may process a video recording of a user during a meeting, presentation, or coaching session and apply AVSR techniques to analyze both audio and visual streams. For example, and without limitation, processor 102 may use a video recording of a user to aid in recognition of audible verbal content such as a user move their lips to speak on video to process the audio content of video recording or user input 108. AVSR may use video recording or user input 108 to aid the overall translation of the audio verbal content of video recording or user input 108. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize keyword, user profile 106 and/or user input 108. For instance, audio vector and image vector may each be concatenated and used to predict speech made by a user, who is 'on camera.'

With continued reference to FIG. 1, in some embodiments, processor 102 may obtain keyword, user profile 106, user input 108, behavior indicators 128 and/or contextual signals 122 using automatic speech recognition (ASR). As a non-limiting example, ASR may analyze audio content captured during a voice message, virtual meeting, phone call, voice assistant interaction, or spoken response to a device prompt 110. In some cases, ASR system may transcribe spoken language into machine-readable text, from which a processor 102 may extract relevant keywords associated with user goals, behavioral indicators 128, or role-specific language or behavioral indicators 128. In some embodiments, ASR may identify speaker attributes, emotional tone, or contextual signals 122. For the purposes of this disclosure, "automatic speech recognition" is a technology that converts spoken language into written text or machine-readable form. In some embodiments, ASR may include techniques employing language processing to aid speech recognition processes. In some cases, ASR may be used to decode (i.e., recognize) indeterministic phonemes or help in forming a preponderance among probabilistic candidates. In some cases, ASR may include an audio-based automatic speech recognition process and an image-based automatic speech recognition process. ASR may analysis audio according to any method described herein, for instance using a Mel frequency cepstral coefficients (MFCCs) and/or log-Mel spectrogram derived from raw audio samples. In some cases, feature recognition may include any feature recognition process described in this disclosure, for example a variant of a convolutional neural network.

Still referring to FIG. 1, in some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 102. Processor 102 may then train an automatic speech recognition model according to training data which includes audible verbal content correlated to known content. In this way, processor 102 may analyze a person's specific voice and train an automatic speech recognition model to the person's speech, resulting in increased accuracy. Alternatively or additionally, in some cases, processor 102 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 102 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments, HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics, any data that can be turned into a linear representation can be analyzed with DTW. In some cases, DTW may be used by an automatic speech recognition process to cope with different speaking (i.e., audible verbal content) speeds. In some cases, DTW may allow processor 102 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 3-5. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, in some embodiments, processor 102 may use a language processing module to find a contextual signal 122 or keyword. The language processing module may be configured to extract, from one or more documents or textual responses of user input 108, one or more words. One or more words may include, without limitation, strings of one or more characters, including without limitation any sequence or sequences of letters, numbers, punctuation, diacritic marks, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

With continued reference to FIG. 1, language processing module may operate to produce a language processing model. Language processing model may include a program automatically generated by processor 102 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator May be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module may then use such associations to analyze words extracted from one or more documents and determine that the one or more documents indicate significance of a category. In an embodiment, language module and/or processor 102 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 102. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 102 may automatically obtain the document using such an identifier, for instance by submitting a request to a database or compendium of documents such as JSTOR as provided by Ithaka Harbors, Inc. of New York.

With continued reference to FIG. 1, in some cases, determining one or more contextual signals 122 may include retrieving external data 130 from one or more external data sources 116 and determining the one or more contextual signals 122 as a function of the external data 130. For the purposes of this disclosure, "external data" is any information originating from external data sources. As a non-limiting example, external data 130 may include market conditions, market changes, regulatory updates, news events, industry trends, competitor activities, economic indicators, organizational announcements, Customer Relationship Management (CRM) or Enterprise Resource Planning (ERP) system data, project management records, or collaborative tool metadata. In some embodiments, external data 130 may be processed alongside user profile 106 and user input 108 to generate contextual signals 122 that reflect broader environmental or organizational dynamics. For the purposes of this disclosure, "external data sources" are any systems, platforms, services, or repositories that reside outside the core architecture of an apparatus. External data sources 116 may include, but are not limited to, cloud-based software platforms, third-party APIs, enterprise resource planning (ERP) systems, customer relationship management (CRM) systems, project management tools, communication platforms, calendar services, public databases, financial market feeds, regulatory reporting services, and industry news aggregators. In some embodiments, external data sources 116 may be communicatively connected to apparatus 100.

With continued reference to FIG. 1, in some embodiments, processor 102 may generate web crawler to scrape external data 130 from web sources. For the purposes of this disclosure, a "web source" is any internet-based location or online resource that hosts or provides access to data. A web source may include, but is not limited to, websites, web pages, online databases, public or private application processing interface (APIs), social media platforms, forums, blogs, and news websites. For example, and without limitation, web source may include real estate platforms, local government property and building permit websites, and the like.

With continued reference to FIG. 1, in some cases, processor 102 may detect market changes, regulatory updates or competitor moves in external data 130 using information gathered by a web crawler that retrieves publicly available content such as news articles, regulatory announcements, or competitor press releases. For example, and without limitation, processor 102 may extract stock price information by identifying and parsing numerical data, near known company names or ticker symbols, then compute percentage changes over time using a mathematical formula or machine-learning models. In some cases, significant deviations above a predefined threshold may indicate a market change. In some cases, processor 102 may analyze the tone of language used in articles or announcements by applying a sentiment scoring function that assigns numerical polarity to words or phrases, and then calculate average sentiment over time to detect abrupt shifts in perception related to a company or industry. In some cases, processor 102 may scan documents for specific terms such as "compliance," "mandate," or "rule change," and flag those with high term frequency or anomalous word usage patterns using statistical measures.

With continued reference to FIG. 1, in some embodiments, processor 102 may be configured to generate context training data. In a non-limiting example, context training data may include correlations between exemplary user profiles, exemplary user inputs, exemplary external data and/or exemplary contextual signals. In some embodiments, context training data may be stored in user database 120. In some embodiments, context training data may be received from one or more users, user database 120, external computing devices, and/or previous iterations of processing. As a non-limiting example, context training data may include instructions from a user, who may be an expert user, a past user in embodiments disclosed herein, or the like, which may be stored in memory and/or stored in user database 120, where the instructions may include labeling of training examples. In some embodiments, context training data may be updated iteratively on a feedback loop. As a non-limiting example, processor 102 may update context training data iteratively through a feedback loop as a function of user profile 106, user input 108, keyword, external data 130, or the like. In some embodiments, processor 102 may be configured to generate a context machine-learning model 136. In a non-limiting example, generating context machine-learning model 136 may include training, retraining, or fine-tuning context machine-learning model 136 using context training data or updated context training data. In some embodiments, context machine-learning model 136 may have been trained with context training data. In some embodiments, processor 102 may be configured to determine contextual signal 122 and/or behavior indicator 128 using context machine-learning model 136 (i.e., trained or updated context machine-learning model 136). In some embodiments, context machine-learning model 136 may receive user profiles 106, user inputs 108, and/or external data 130 as inputs and may output contextual signals 122 in response to the inputs. In some embodiments, context machine-learning model 136 may function differently between training time and inference time. In a non-limiting example, at training time, processor 102 may be configured to train, retrain, or fine-tune context machine-learning model 136 using context training data. During the training time, context machine-learning model 136 may learn to associate patterns within user profiles 106, user inputs 108, and/or external data 130. In a non-limiting example, at inference time, trained context machine-learning model 136 may be configured to receive previously unseen user profiles 106, user inputs 108, and/or external data 130 and, based on the representations learned during training time, automatically output a selection of contextual signals 122 corresponding to the inputs. Inference may be triggered in response to a user request, system event, or automated workflow operation.

With continued reference to FIG. 1, in some embodiments, a user, user profile 106, and/or user input 108 may be classified to a user cohort using a cohort classifier. Cohort classifier may be consistent with any classifier discussed in this disclosure. Cohort classifier may be trained on cohort training data, wherein the cohort training data may include user profile 106, and/or user input 108 correlated to user cohorts. In some embodiments, a user, user profile 106, and/or user input 108 may be classified to a user cohort and processor 102 may determine contextual signal 122 based on the user cohort using a machine-learning module as described in detail with respect to FIG. 3 and the resulting output may be used to update context training data. In some embodiments, generating training data and training machine-learning models may be simultaneous. In some embodiments, processor 102 may generate contextual signal 122 without the use of context machine-learning model 136.

With continued reference to FIG. 1, memory 104 contains instructions configuring processor 102 to generate a device prompt 110 as a function of one or more contextual signals 122. For the purposes of this disclosure, a "device prompt" is a message, signal, or communication to engage, guide, inform, or elicit a response from a user. As a non-limiting example, device prompt 110 may include a form of a question, suggestion, reflection point, reminder, notification, or directive. In some cases, device prompt 110 may be adapted in content, tone, structure (e.g., prompt language 138), and timing (e.g., delivery time) according to behavioral indicators 128 or contextual signals 122. For example, and without limitation, device prompt 110 may include a question such as, "What is preventing progress on your current objective?," a suggestion such as, "Consider scheduling uninterrupted focus time to address this priority," a reflection point such as, "How did your leadership approach impact your team's performance this week?," a reminder such as, "Your quarterly planning session is scheduled for tomorrow, would you like to prepare a brief outline in advance?," a notification such as, "A new stakeholder has joined your project team, review updated responsibilities," or a directive such as, "Reprioritize your top three tasks to align with revised company goals. In some cases, user may manually input device prompt 110. For example, and without limitation, device prompt 110 may include targeted questions regarding why a user is not meeting their goals or how a user has handled their new responsibilities. For example, and without limitation, device prompt 110 may be configured to initiate an explicit alignment conversation to reset expectations, such as "We have not been connecting. What would you like to adjust so I can best support you?"

With continued reference to FIG. 1, in some cases, generating device prompt 110 may include modifying the device prompt 110 using a large language model 140 to adapt a prompt language 138 to match a preferred persona of user profile 106, wherein the large language model 140 may have been trained on exemplary device prompts. For the purposes of this disclosure, "prompt language" is a textual or linguistic content of a device prompt. As a non-limiting example, prompt language 138 may include tone, phrasing, vocabulary, syntax, and stylistic features. In some cases, prompt language 138 may be adapted based on factors such as a user's preferred persona, personality attributes, communication style preferences, contextual signals 122, and historical device responsiveness. In some cases, prompt language 138 may vary depending on a communication channels 112*a-n*, intended prompt function (e.g., reflection, nudge, escalation), and/or behavioral indicators 128. For instance, and without limitation, a device prompt

110 may be expressed in a concise, authoritative tone (a first prompt language) or in a more reflective, supportive tone (a second prompt language).

With continued reference to FIG. 1, in some cases, processor 102 may generate device prompt 110 using a large language model (LLM) 140. A "large language model," as used herein, is a deep learning algorithm that can recognize, summarize, translate, predict and/or generate text and other content based on knowledge gained from massive datasets. LLM 140 may be a type of generative artificial intelligence (AI). LLMs 140 may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, emails, advertising documents, newspaper articles, and the like. LLMs 140, in some embodiments, may include GPT, GPT-2, GPT-3, and other language processing models. LLM 140 may be used to augment the text in an article based on a prompt. Training data may correlate elements of a dictionary related to linguistics to a device prompt 110. LLM 140 may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM 140 may output such predictions by ranking words by likelihood or a prompt parameter. For the example given above, the LLM 140 may score "you" as the most likely, "your" as the next most likely, "his" or "her" next, and the like.

Still referring to FIG. 1, LLM 140 may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM 140 may predict the next word by searching for a set of position in a source sentence where the most relevant information is concentrated. LLM 140 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM 140 may include encoder-decoder model incorporating an attention mechanism.

Still referring to FIG. 1, LLM 140 may include a transformer architecture. In some embodiments, encoder component of LLM 140 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 140 may predict the next word by searching for a set of position in a source sentence where the most relevant information is concentrated. LLM 140 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM 140, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 140 may pick up particular parts at different positions in the input sequence and over time compute an initial composition of the output sequence. In multi-head attention, LLM 140 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 140 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM 140 may make use of attention alignment scores based on a number of factors. These alignment scores may be calculated at different points in a neural network. Source or input sequence words but not to an exact degree. This correlation may take into account all hidden states and the final alignment score is the summation of the matrix of alignment scores. In global attention (Luong mechanism), in situations where neural machine translations are required, LLM 140 may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, LLM 140 may learn to associate the word "you," with "how" and "are." It is also possible that LLM 140 learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM to learn to extract and focus on different combinations of attention from its attention heads.

With continued reference to FIG. 1, in some embodiments, LLM 140 may be specifically trained using large language model (LLM) training data. In some embodiments, LLM training data may include correlations between exemplary contextual signals or exemplary behavior indicators, exemplary user profiles, exemplary user inputs, exemplary external data, and exemplary device prompts. LLM training data may include correlations between text data representing exemplary contextual signals or exemplary behavior indicators, exemplary user profiles, exemplary user inputs, and exemplary device prompts. In some embodiments, LLM training data may include a set of data that is in user's voice, email, or the like to mimic them. In some embodiments, LLM training data may be consistent with any training data described in the entirety of this disclosure. In some embodiments, LLM training data may be received from one or more users, user database 120, external computing devices, and/or previous iterations of processing. As a non-limiting example, LLM training data may include instructions from a user, who may be an expert user, a past user in embodiments disclosed herein, or the like, which may be stored in memory and/or stored in user database 120, where the instructions may include labeling of training examples. In some embodiments, LLM training data may be updated iteratively through a feedback loop. As a non-limiting example, LLM training data may be updated iteratively through a feedback loop as a function of newly collected user profile 106, user input 108, external data 130, contextual signal 122, behavior indicator 128, or the like. In some embodiments, processor 102 may be configured to generate LLM 140. In a non-limiting example, generating LLM 140 may include training, retraining, or fine-tuning LLM 140 using LLM training data or updated LLM training data. In some embodiments, processor 102 may be configured to generate device prompt 110 using LLM 140 (i.e., trained or updated LLM).

With continued reference to FIG. 1, in some embodiments, processor 102 may incorporate retrieval augmented generation (RAG) into LLM 140. For the purposes of this disclosure, "retrieval-augmented generation" is a method that enhances a response generation capability of a large language model by integrating external, relevant information retrieved from a structured database or unstructured corpus. In some embodiments, by leveraging RAG, LLM 140 can reduce a risk of generating incorrect or hallucinated information, instead relying on curated and contextually relevant data. For the purposes of this disclosure, "hallucination" of information refers to where a language model fabricates plausible-sounding but incorrect information. In some embodiments, processor 102 may retrieve relevant information as a function contextual signal 122 from internal (e.g., user database 120) or external database and the retrieved data may be input into LLM 140 to generate responses (device prompt 110) grounded in authoritative sources. In some embodiments, processor 102 may identify keywords or semantic elements in the query and using these elements to search a database for information.

With continued reference to FIG. 1, in some embodiments, processor 102 may utilize similarity-based fetching techniques to identify most relevant data for input to LLM 140. For the purposes of this disclosure, "similarity-based fetching" is a process by which a query is converted into a high-dimensional vector embedding, representing its semantic meaning, and compared with pre-computed embeddings of documents or data in a database. In some embodiments, retrieved documents with high similarity scores may be integrated into an input for LLM 140. In some embodiments, processor 102 may select an appropriate database for a given query based on context and sensitivity of information. In some embodiments, LLM 140 may generate an initial response based on an input query, and this response may be then analyzed to identify additional relevant keywords or concepts. In some embodiments, these elements may subsequently be used to perform a second round of data retrieval. In a non-limiting example, additional retrieved data may then be input into LLM 140 alongside the original query and first response to generate an output (e.g., device prompt 110).

With continued reference to FIG. 1, in some embodiments, processor 102 may generate hypothetical document embeddings. For the purposes of this disclosure, a "hypothetical document embedding" refers to an embedding created by LLM that represents its semantic understanding of a query or preliminary response. In some embodiments, the embeddings may be compared against database embeddings to identify documents or data closely aligned with the system's understanding of a query. In some embodiments, the retrieved information may then be incorporated into an input of LLM 140.

With continued reference to FIG. 1, memory 104 contains instructions configuring processor 102 to transmit a device prompt 110 to a downstream device 118 through a first communication channel 112*a*. For the purposes of this disclosure, a "communication channel" is any medium, interface, or transmission pathway through which data is delivered. As a non-limiting example, communication channel 112 may include email systems, text messaging platforms (SMS), mobile push notifications, collaboration tools, calendar integrations, in-application dashboards, or voice-based interfaces. In some cases, processor 102 may be configured to transmit device prompt 110 or any data describe in this disclosure that is related to user profile 106 or user input 108 through a plurality of communication channels 112*a-n*. As a non-limiting example, plurality of communication channels 112*a-n* may be consistent with any communication channels describe herein in this disclosure. In some cases, processor 102 may select one or more of communication channels 112*a-n* based on delivery preferences specified in a user profile 106, responsiveness patterns derived from user input 108, or contextual signals 122 indicating optimal timing or medium. In some embodiments, processor 102 may dynamically switch between communication channels 112*a-n* to maintain engagement. For example, and without limitation, processor 102 may transmit an initial device prompt 110 through messaging platform (first communication channel 112*a*) and following up through email (second communication channel 112*b*) if no response is detected (negative responsiveness 142).

With continued reference to FIG. 1, transmitting device prompt 110 includes detecting a device responsiveness 124 of downstream device 118. For the purposes of this disclosure, "device responsiveness" is an attribute indicating the degree to which a downstream device receives, displays, or facilitates user engagement with a transmitted device prompt. In some cases, device responsiveness 124 may include a negative responsiveness 142. For the purposes of this disclosure, "negative responsiveness" is a condition that indicates an absence of meaningful engagement or interaction from a downstream device or user following the transmission of one or more device prompts. In some cases, negative responsiveness 142 may include indicators such as prompt delivery without acknowledgment, failure to open or interact with a device prompt 110 within a specified time window, repeated prompt dismissals, delayed responses exceeding acceptable latency limits, or a consistent decline in engagement frequency. In some embodiments, negative responsiveness 142 may include contextual factors such as device inactivity, conflicting calendar events, or user status signals indicating unavailability. In some cases, device responsiveness 124 may include positive responsiveness 144. For the purposes of this disclosure, "positive responsiveness" is a condition that indicates timely and meaningful engagement from a downstream device or user following the transmission of one or more device prompts. In some cases, positive responsiveness 144 may include indicators such as device prompt opens, user replies or acknowledgments, interaction within a defined time threshold, sustained engagement over multiple prompts, or behavioral signals indicating that a user has acted upon a device prompt content. In some embodiments, positive responsiveness 144 may include contextual confirmations such as task completion, calendar updates, goal realignment, or sentiment indicators reflecting comprehension or motivation. In some cases, user may manually input device responsiveness 124.

With continued reference to FIG. 1, in some cases, processor 102 may determine device responsiveness 124 as a function of responsiveness metrics 146. The responsiveness metrics 146 are described in detail below. In some cases, device responsiveness 124 may be determined based on system-detectable signals such as device prompt delivery confirmations, user interaction timestamps, device prompt open rates, latency in user response, read receipts, or engagement consistency over time. In a non-limiting example, when a device prompt 110 is sent through a communication channel 112*a*, processor 102 may monitor for a delivery confirmation signal, indicating that the device prompt 110 was successfully received by a downstream device 118. Once delivered, the processor 102 may track whether the device prompt 110 was opened, using data such as read receipts, application activity logs, or prompt open events. In a non-limiting example, processor 102 may record user interaction timestamps, such as when a user begins or completes a response (e.g., a portion of user input 108) to device prompt 110 and may measure the time elapsed between device prompt delivery and response, thereby determining response latency. For example, and without limitation, open rates across multiple device prompts 110 may be analyzed over time to assess engagement consistency, with higher rates and faster response times corresponding to positive responsiveness 144. For example, and without limitation, repeated delivery without interaction, delayed engagement, or decreasing open rates may indicate negative responsiveness 142. In some cases, processor 102 may evaluate passive behavioral indicators 128, such as application foreground or background status, screen activation events, or device idle time, which may signal whether a user is actively using a downstream device 118 at the time of device prompt transmission. For instance, and without limitation, if a mobile device remains locked or inactive for a prolonged period after device prompt delivery, processor 102 may infer negative responsiveness 142. In some embodiments, processor 102 may interface with system-level notification services to detect whether a device prompt 110 was dismissed, ignored, or snoozed, offering further insight into user engagement. In some embodiments, processor 102 may leverage calendar and availability data to determine whether a user was occupied, in a scheduled meeting, or in a focus block during the time of device prompt transmission. In a non-limiting example, if a device prompt 110 was delivered during a known conflict window, lack of response may be weighted differently than if a user were unoccupied. In some embodiments, processor 102 may correlate device responsiveness 124 with interaction patterns across integrated systems. For example, and without limitation, if a user takes action in a CRM, project management tool, or communication platform shortly after receiving a device prompt 110, processor 102 may infer indirect device responsiveness 124 even if the device prompt 110 itself was not explicitly acknowledged.

With continued reference to FIG. 1, in some cases, transmitting device prompt 110 may include monitoring communications from the downstream device, detecting a negative responsiveness 142 as a function of a responsiveness threshold 148, modifying at least a transmittal parameter 126 to include a second communication channel 112*b* as a function of user input 108 and the negative responsiveness 142 and transmitting the device prompt 110 through the second communication channel 112b. For the purposes of this disclosure, a "responsiveness threshold" is a criterion for evaluating whether a device responsiveness meets, exceeds, or falls below an acceptable level of engagement. In some cases, responsiveness threshold 148 may be pre-defined or dynamically adjustable. In some cases, responsiveness threshold 148 may be expressed as a quantitative or qualitative limit based on one or more responsiveness metrics 146, including but not limited to prompt open rates, response latency, interaction frequency, acknowledgment rates, or behavioral engagement over a defined time interval. In some embodiments, responsiveness threshold 148 may be calibrated per user, role, or communication channel 112a-n based on historical interaction patterns, user profile 106, or contextual signals 122. In some cases, processor 102 may compare detected device responsiveness 124 against a responsiveness threshold 148 to determine whether to classify a user's state as positive responsiveness 144 or negative responsiveness 142. As a non-limiting example, processor 102 may track user interactions with a series of device prompts 110 delivered over a defined time period and calculate a device responsiveness 124 based on prompt open rates and average response latency. If, over the past seven days, the user has opened only 1 out of 5 device prompts 110 and responded more than 24 hours after delivery, processor 102 may calculate that the device responsiveness 124 falls below a predefined responsiveness threshold 148, such as a 50% open rate with a maximum 12-hour response window. Based on this comparison, processor 102 may classify the device responsiveness 124 as negative responsiveness 142. Conversely, if the user had opened 4 out of 5 prompts and responded within one hour on average, the device responsiveness 124 would exceed the responsiveness threshold 148, and processor 102 may classify the device responsiveness 124 as positive responsiveness 144. In some cases, processor 102 may retrieve responsiveness threshold 148 from a user database 120. In some cases, user may manually input responsiveness threshold 148. Upon detecting negative responsiveness 142, in a non-limiting example, processor 102 may determine a second communication channel 112b that may be more effective for reaching a user. In some cases, processor 102 may determine a second communication channel 112b based on both negative responsiveness 142 and any relevant user input 108, which may include a user's stated channel preferences, past responsiveness by communication channel 112b, or other profile data. For example, and without limitation, if a user has consistently ignored mobile notifications but has previously engaged through email, processor 102 may select email as a second communication channel 112b. In some cases, processor 102 may transmit the same or a modified version of device prompt 110 through the selected second communication channel 112b.

With continued reference to FIG. 1, in some cases, transmitting device prompt 110 may include modifying a prompt language 138 of the device prompt 110 as a function of negative responsiveness 142 and transmitting the device prompt 110 with the modified prompt language 138 to downstream device 118. For example, and without limitation, if processor 102 detects that a user has consistently failed to open or respond to device prompts 110 within a defined responsiveness threshold 148, indicating negative responsiveness 142, processor 102 may alter linguistic tone, structure, or rhetorical approach (transmittal parameter 126) of device prompt 110 to improve the likelihood of engagement. In some embodiments, prompt language 138 may be adjusted to adopt a more concise, empathetic, or motivating tone. In some embodiments, prompt language 138 may incorporate direct references to user behavior or performance to increase relevance. In some embodiments, prompt language 138 may be modified using a rule-based engine or a large language model 140 that rephrases device prompt 110 while preserving its core intent. Once the modified prompt language 138 has been generated, processor 102 may transmit the updated device prompt 110 to a downstream device 118 through a selected communication channel 112a-n.

With continued reference to FIG. 1, transmitting device prompt 110 includes modifying at least a transmittal parameter 126 as a function of device responsiveness 124. For the purposes of this disclosure, a "transmittal parameter" is an attribute or condition governing the manner in which a device prompt is delivered from the apparatus to a downstream device. As a non-limiting example, transmittal parameter 126 may include delivery time 150, delivery frequency, and the like. In some embodiments, delivery frequency may indicate how often device prompts 110 are transmitted within a defined period. As another non-limiting example, transmittal parameter 126 may include communication channel selection, prompt priority level, and notification modality. In some cases, communication channel selection may include determining which of a plurality of communication channels 112a-n is most appropriate for transmitting device prompt 110. In some cases, prompt priority level may indicate how prominently or urgently a device prompt 110 is presented on a downstream device 118. In some cases, notification modality may indicate a type of alert used to present device prompt 110, including pop-ups, banners, sounds, vibrations, or calendar embeds. In some cases, user may manually determine or modify transmittal parameter 126. In a non-limiting example, processor 102 may adjust transmittal parameter 126 to delay delivery during periods of known unavailability, switch channels when responsiveness drops below a threshold, or escalate delivery urgency when strategic alignment is at risk. In some cases, processor 102 may adjust transmittal parameter 126 based on energy-based timing, prompting when a user's focus or mindset is best for strategic thinking. In some cases, processor 102 may adjust transmittal parameter 126 based on travel or time-zone shifts, adjusting device prompts 110 to keep cadence natural and useful, wherever a user is. In some cases, processor 102 may adjust transmittal parameter 126 for pre-meeting prep, noticing an upcoming meeting and prompting strategic reflection just beforehand. In some cases, processor 102 may adjust transmittal parameter 126 for post-meeting recalibration: helping the user capture lessons or reprioritize after big sessions. In some cases, modifying transmittal parameter 126 may include modifying intervals of receiving user profile 106 and/or user input 108.

With continued reference to FIG. 1, in some cases, transmitting device prompt 110 may include determining a delivery time of the device prompt 110 as a function of user profile 106 and transmittal parameter 126. For the purposes of this disclosure, "delivery time" is a transmittal parameter that specifies at which a device prompt can be transmitted to a downstream device. In some embodiments, delivery time 150 may be explicitly defined by user preferences stored in user profile 106. For example, and without limitation, user profile 106 may include designated windows for receiving device prompts 110 (e.g., early morning planning periods or end-of-day reflections). In some embodiments, delivery time 150 may be inferred by processor 102 based on historical interaction patterns. For example, and without limitation, processor 102 may determine delivery time 150 based on times of day when a user has consistently demonstrated positive responsiveness 144. In some embodiments, delivery time 150 may be adjusted dynamically based on contextual signals 122 or behavioral indicators 128. For example, and without limitation, processor 102 may determine delivery time 150 based on calendar availability (e.g., event datum 134 as described below), time-zone transitions, or periods of device inactivity. By selecting an optimal delivery time tailored to the user's engagement profile and situational context, apparatus 100 may increase the likelihood that a device prompt 110 will be received, opened, and acted upon in a timely and effective manner.

With continued reference to FIG. 1, in some cases, modifying at least a transmittal parameter 126 may include querying a calendar application programming interface (API) as a function of the user profile 106, receiving, from the calendar API, a plurality of calendar objects, verifying whether the at least a transmittal parameter 126 overlaps with one or more of the plurality of calendar objects and modifying the at least a transmittal parameter 126 as a function of the verification. For the purposes of this disclosure, a "calendar application programming interface" or "calendar API" is a software interface that allows processor to programmatically access, retrieve, and interpret scheduling information associated with a user's digital calendar. In some cases, calendar API may be provided by third-party services or internal enterprise scheduling systems. In some cases, calendar API may support authenticated access to event data, availability windows, meeting metadata, and user-configured time blocks. In some embodiments, querying a calendar API may include sending a request that references user credentials, profile identifiers, or authorization tokens to retrieve temporally structured calendar data. For the purposes of this disclosure, a "calendar object" is a structured data element returned by a calendar API. In some cases, calendar object may represent a discrete scheduled occurrence, availability setting, or time-bound activity in a user's calendar. As a non-limiting example, a calendar object may include one or more of a start time, end time, title, description, attendee list, location, recurrence rule, status (e.g., confirmed, tentative, canceled), and associated metadata such as meeting organizer or priority tags. In some cases, calendar object may correspond to user-scheduled meetings, focus blocks, out-of-office entries, reminders, or tasks. In some cases, processor 104 may parse calendar object attributes to determine whether a delivery window for a device prompt 110 overlaps with or conflicts with a scheduled event, thereby enabling the modification of at least a transmittal parameter 126, such as delivery time, to avoid interruption or enhance contextual relevance. In some cases, the verification may involve comparing transmittal parameter 126, such as a candidate timestamp or time range, against the start and end times of each calendar object. For example, and without imitation, if an overlap is detected (e.g., if the device prompt 110 is scheduled to be transmitted during a meeting, focus block, or out-of-office period), processor 102 may modify the transmittal parameter 126 by shifting the delivery time to a non-conflicting period. In some cases, the modification may adjust communication channel or prompt tone, such as delaying the prompt for a quieter time or rephrasing it to match a post-meeting reflection state.

With continued reference to FIG. 1, in some cases, modifying transmittal parameter 126 may include identifying an event datum 134 from user profile 106 and modifying the at least a transmittal parameter 126 as a function of the event datum 134. For the purposes of this disclosure, an "event datum" is a data element representing a scheduled occurrence in a user's calendar. As a non-limiting example, event datum 134 may indicate a specific activity or entry, such as a meeting in a digital calendar, a task deadline, a scheduled focus block, a stakeholder presentation, or any other time-bound commitment. In some cases, processor 102 may identify event datum 134 by accessing calendar integrations or other scheduling systems (e.g., external data sources 116) linked to a user profile 106. In some cases, processor 102 may extract relevant metadata, including start and end times, event title, participant list, recurrence pattern, and associated location or virtual meeting link. In some cases, processor 102 may analyze event datum 134 to determine user availability, detect scheduling conflicts, or infer periods of cognitive load or strategic significance and based on this analysis, processor 102 may use event datum 134 as a contextual signal 122 to adjust delivery time 150, modify prompt language 138, delay or accelerate transmittal parameter 126, and the like. For example, and without limitation, processor 102 may adjust delivery time 150 to avoid transmitting device prompt 110 during an event or meeting. For example, and without limitation, processor 102 may reschedule device prompt 110 to occur immediately before or after an event or meeting. For example, and without limitation, processor 102 may modify delivery frequency to temporarily suppress prompt transmission during high-density event periods or increase cadence during windows of low event activity.

With continued reference to FIG. 1, in some cases, modifying at least a transmittal parameter 126 may include receiving a series of responsiveness metrics 146, determining a response pattern 152 of a downstream device 118 as a function of the series of responsiveness metrics 146 using a pattern classifier that has been trained with pattern training datasets including exemplary responsiveness metrics and modifying the at least a transmittal parameter 126 as a function of the response pattern 152. For the purposes of this disclosure, "responsiveness metrics" are indicators of the degree, quality, or consistency of user engagement with one or more device prompts over time. As a non-limiting example, responsiveness metrics 146 may include response latency, frequency of user interactions, prompt acknowledgment rates, time-to-engagement intervals, interaction completion rates, and variations in prompt dismissal or snoozing behavior. In some embodiments, responsiveness metrics 146 may be aggregated over defined time windows. In some embodiments, responsiveness metrics 146 may be analyzed on a per-communication channel or per-device prompt basis. In some cases, processor 102 may use responsiveness metrics 146 to compare against a responsiveness threshold 148, classify a user's state as positive or negative responsiveness, or adjust transmittal parameters 126 accordingly. For the purposes of this disclosure, a "response pattern" is a recurring or identifiable sequence, trend, or characteristic in how a user interacts with one or more device prompts over time. As a non-limiting example, response pattern 152 may include attributes such as typical response latency, preferred times of engagement, consistency or variability in responsiveness, frequency of prompt acknowledgment or dismissal, and preferred communication channels 112*a-n*. In some embodiments, response pattern 152 may be derived from responsiveness metrics 146 and user input 108. For example, and without limitation, response pattern 152 may include a pattern indicating engaging only during specific time windows, delaying responses to certain types of device prompts, or consistently ignoring device prompts delivered through a particular communication channel. As a non-limiting example, modifying the at least a transmittal parameter 126 as a function of response pattern 152 may include adjusting delivery time 150 of a device prompt 110. For instance, and without limitation, if processor 102 identifies a response pattern 152 indicating that a user consistently responds to device prompts 110 delivered between 8:00 AM and 10:00 AM and rarely engages with device prompts 110 sent in the afternoon, processor 102 may modify transmittal parameter 126 by scheduling future device prompts 110 for morning delivery. For instance, and without limitation, if a response pattern 152 reveals that a user engages more reliably with device prompts 110 sent through mobile notifications rather than email, processor 102 may modify a communication channel selection parameter to prioritize mobile delivery.

With continued reference to FIG. 1, for the purposes of this disclosure, a "pattern classifier" is a machine learning model configured to categorize or identify patterns within responsiveness metrics. In some embodiments, pattern classifier may include logistic regression models, decision trees, support vector machines (SVMs), recurrent neural networks (RNNs), convolutional neural networks (CNNs), transformer-based architectures, or ensemble learning methods. In some embodiments, pattern classifier may be configured to process a sequence or distribution of responsiveness metrics 146 and produce an output corresponding to a user's response pattern (response pattern 152), such as "highly engaged," "sporadic responder," or "non-responsive." For the purposes of this disclosure, "pattern training datasets" are collections of labeled or unlabeled data samples used to train a pattern classifier. In some cases, pattern training datasets may include one or more exemplary responsiveness metrics along with known or inferred response patterns. As a non-limiting example, each entry in pattern training datasets may include time-stamped interaction logs, prompt open rates, read receipt data, response delays, channel-specific response variations, and engagement consistency metrics. In some cases, pattern classifier and pattern training datasets may be consistent with any classifier and training data described in this disclosure.

With continued reference to FIG. 1, in some cases, machine learning models may be employed to detect long-term trends, anomalies, or predictive patterns that indicate shifts in device responsiveness 124. In some cases, responsiveness machine learning model 154 may analyze a series of responsiveness metrics 146, such as prompt open rates, response times, prompt interaction frequency, and channel-specific responsiveness, aggregated over days, weeks, or months. In some cases, responsiveness machine learning model 154 may learn typical responsiveness baselines for a given user or user segment, identifying response pattern 152 in how users generally interact with device prompts 110 across different times of day, days of the week, or types of prompt content. For example, and without limitation, responsiveness machine learning model 154 may determine that a user typically responds to device prompts 110 delivered in the morning through mobile notifications but ignores those sent in the late afternoon through email. This learned behavioral baseline may allow an apparatus 100 to optimize future delivery strategies. To detect anomalies, responsiveness machine learning model 154 may compare current engagement behavior against established norms or expected values. For instance, and without limitation, if a user who consistently responds to device prompts 110 within 15 minutes suddenly becomes unresponsive over a 48-hour period, responsiveness machine learning model 154 may flag this deviation as an anomaly. In some cases, anomaly detection may be based on statistical thresholds, clustering techniques, or probabilistic models that characterize what constitutes abnormal behavior relative to historical patterns. In some cases, detection of such anomalies may trigger a system response, such as modifying transmittal parameter 126 by reducing prompt frequency, changing communication channel 112*a-n*, or initiating a second device prompt to re-engage a user. In some cases, to identify predictive patterns, responsiveness machine learning model 154 may use classification or regression algorithms to forecast future device responsiveness 124 based on contextual and behavioral inputs. In a non-limiting example, inputs to responsiveness machine learning model 154 may include prior prompt outcomes, communication channel used, time of delivery, user availability status, calendar activity, environmental factors (such as time zone changes), and external data 130 such as organizational events. In a non-limiting example, responsiveness machine learning model 154 may output a probability score representing the likelihood that a user will engage with a forthcoming device prompt 110. In some cases, predictive capability may allow processor 102 to make real-time adjustments to transmittal parameters 126, such as selecting an optimal delivery time, channel, or tone, before dispatching device prompt 110. In some embodiments, supervised learning models (e.g., responsiveness machine learning model 154) may be trained using labeled historical data indicating successful and unsuccessful prompt interactions, while unsupervised learning models may be used to discover new patterns without requiring labeled outcomes. responsiveness machine learning model 154 reinforcement learning models (e.g., responsiveness machine learning model 154) may be applied to continuously adapt prompt strategies based on feedback from a user's ongoing engagement behavior.

With continued reference to FIG. 1, in some cases, generating device prompt 110 may include detecting an alignment deviation 132 among a plurality of users as a function of device responsiveness 124 and generating the device prompt 110 as a function of the alignment deviation 132. For the purposes of this disclosure, an "alignment deviation" is a divergence between a user's current actions, behaviors, communications, or strategic focus and one or more user goals. As a non-limiting example, alignment deviation 132 may include inconsistent goal tracking, missed milestones, communication tone shifts, engagement drop-offs, conflicting task prioritization, or discrepancies between user actions and collective team direction. In some cases, alignment deviation 132 may be detected by processor 102 through analysis of user input 108, behavioral indicators 128, responsiveness metrics 146, or contextual signals 122 that suggest a lack of coherence between a user's observed behavior and their user goals. For example, and without limitation, processor 102 may compare responsiveness metrics 146 and behavioral indicators 128 across multiple users working on a shared goal or project and may determine that one or more users are not engaging with device prompts 110 or tasks at a rate consistent with the rest of the team. Upon detecting an alignment deviation 132, processor 102 may generate a device prompt 110 targeted either to the affected user or to the team, addressing the misalignment by prompting for clarification of responsibilities, reflection on blockers, or adjustment of task sequencing. In a non-limiting example, processor 102 may access user goals stored in user profile 106 and evaluate recent user input 108 and behavioral indicators 128 to determine whether the user's current focus, output, or engagement patterns are consistent with expected trajectory defined by user goals. Continuing the non-limiting example, alignment deviation 132 may be detected when processor 102 identifies conditions such as missed deadlines, failure to act on time-sensitive prompts, repeated deferment of goal-related tasks, inconsistent communication tone in reflective responses, or reduced engagement in key collaborative initiatives. Processor 102 may further compare responsiveness metrics 146 across a set of related device prompts 110 to determine whether the user is avoiding or deprioritizing device prompts 110 associated with specific strategic areas, suggesting a misalignment in attention or execution. In some embodiments, processor 102 may cross-reference a user's behavior with data from other users engaged in a shared objective to determine whether discrepancies exist in task status, alignment confidence scores, or engagement timing. For example, and without limitation, if a user consistently lags behind team members in responding to device prompts 110 tied to a shared milestone, processor 102 may infer an alignment deviation 132. Upon identifying alignment deviation 132, processor 102 may log the alignment deviation 132 as a contextual signal 122 for use in generating a device prompt 110 which may be structured to clarify priorities, elicit user feedback, or suggest corrective actions that realign the user's behavior with user goals.

With continued reference to FIG. 1, in some embodiments, at least a processor 102 may be configured to generate a user interface 114 displaying user profile 106, user input 108, contextual signals 122, device prompt 110, device responsiveness 124, transmittal parameter 126, behavior indicator 128, external data 130, alignment deviation 132, event datum 134, and the like. For the purposes of this disclosure, a "user interface" is a means by which a user and a computer system interact. For example through the use of input devices and software. A user interface 114 may include a graphical user interface (GUI), command line interface (CLI), menu-driven user interface, touch user interface, voice user interface (VUI), form-based user interface, any combination thereof and the like. In some embodiments, user interface 114 may operate on and/or be communicatively connected to a decentralized platform, metaverse, and/or a decentralized exchange platform associated with the user. For example, a user may interact with user interface 114 in virtual reality. In some embodiments, a user may interact with the user interface 114 using a computing device distinct from and communicatively connected to at least a processor 102. For example, a smart phone, smart, tablet, or laptop operated by a user. In an embodiment, user interface 114 may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in a non-limiting example, processor 102 may be configured to initiate a secure communication channel interface between a downstream device 118 and processor 102. A "secure communication channel interface," as used in this disclosure, is a communication medium within an interface. A secure communication channel interface may include an application, script, and/or program capable of providing a means of communication between at least two parties, including any oral and/or written forms of communication. A secure communication channel interface may allow processor 102 to interface with electronic devices through graphical icons, audio indicators including primary notation, text based user interfaces, typed command labels, text navigation, and the like. A secure communication channel interface may include slides or other commands that may allow a user to select one or more options. A secure communication channel interface may include free form textual entries, where a user may type in a user input 108, response and/or message. A secure communication channel interface may include a display interface. Display interface may include a form or other graphical element having display fields, where one or more elements of information may be displayed. Display interface may display data output fields including text, images, or the like containing one or more messages. A secure communication channel interface may include data input fields such as text entry windows, drop-down lists, buttons, check-boxes, radio buttons, sliders, links, or any other data input interface that may capture user interaction as may occur to persons skilled in the art upon reviewing the entirety of this disclosure.

With continued reference to FIG. 1, in some embodiments, user interface 114 may include an authentication module. In some embodiments, a secure communication channel interface may implement authentication module. In some embodiments, processor 102 may authenticate user using authentication module. Authentication module may include any suitable software and/or hardware as described in the entirety of this disclosure. Authentication module may include a login portal for users to submit authentication credentials. Authentication module and/or processor 102 may be configured to receive the authentication credential associated with users from a downstream device 118, compare the authentication credential to an authorized authentication credential stored within an authentication database, and bypass authentication for downstream device 118 based on the comparison of the authentication credential from downstream device 118 to the authorized authentication credential stored within user database 120. A "authentication credential" as described in the entirety of this disclosure, is a datum representing an identity, attribute, code, and/or characteristic specific to a user and/or downstream device 118. For example, and without limitation, authentication credential may include a username and password unique to user and/or downstream device 118. The username and password may include any alpha-numeric character, letter case, and/or special character. As a further example and without limitation, the authentication credential may include a digital certificate, such as a public key infrastructure (PKI) certificate. In some embodiments, authentication credential may include biometric identifier, such as but not limited to face recognition, retain, voice, fingerprint, or the like. In some embodiments, authentication credential may include a code, barcode, quick response (QR) code, or the like.

With continued reference to FIG. in a non-limiting embodiment, authentication module may manipulate any information of the entirety of this disclosure to be displayed to a user with varying authority or accessibility as described above. Authentication module may incorporate priority classifiers used to classify low, average, and high classification of authorized users. In a non-limiting example, users with lower priority classifications detected by authentication module may allow a limited amount of information (limited accessibility) to be displayed to downstream device 118 for viewing by the users with lower priority classification. In another non-limiting example, users with lower priority classifications detected by authentication module may allow a limited control of information to modify, add, remove, or the like. In a non-limiting embodiment, authentication module may detect users with high priority classifications and transmit a robust information with full accessibility. Persons of ordinary skill in the art, after viewing the entirety of this disclosure, would appreciate the various amounts of information allowed to be viewed for different levels of authority. In a non-limiting embodiment, authentication module may be used as a security measure for information. A person of ordinary skill in the art, after viewing the entirety of this disclosure, would appreciate the function of an authentication module in the context of secure data exchange.

Figure 2:
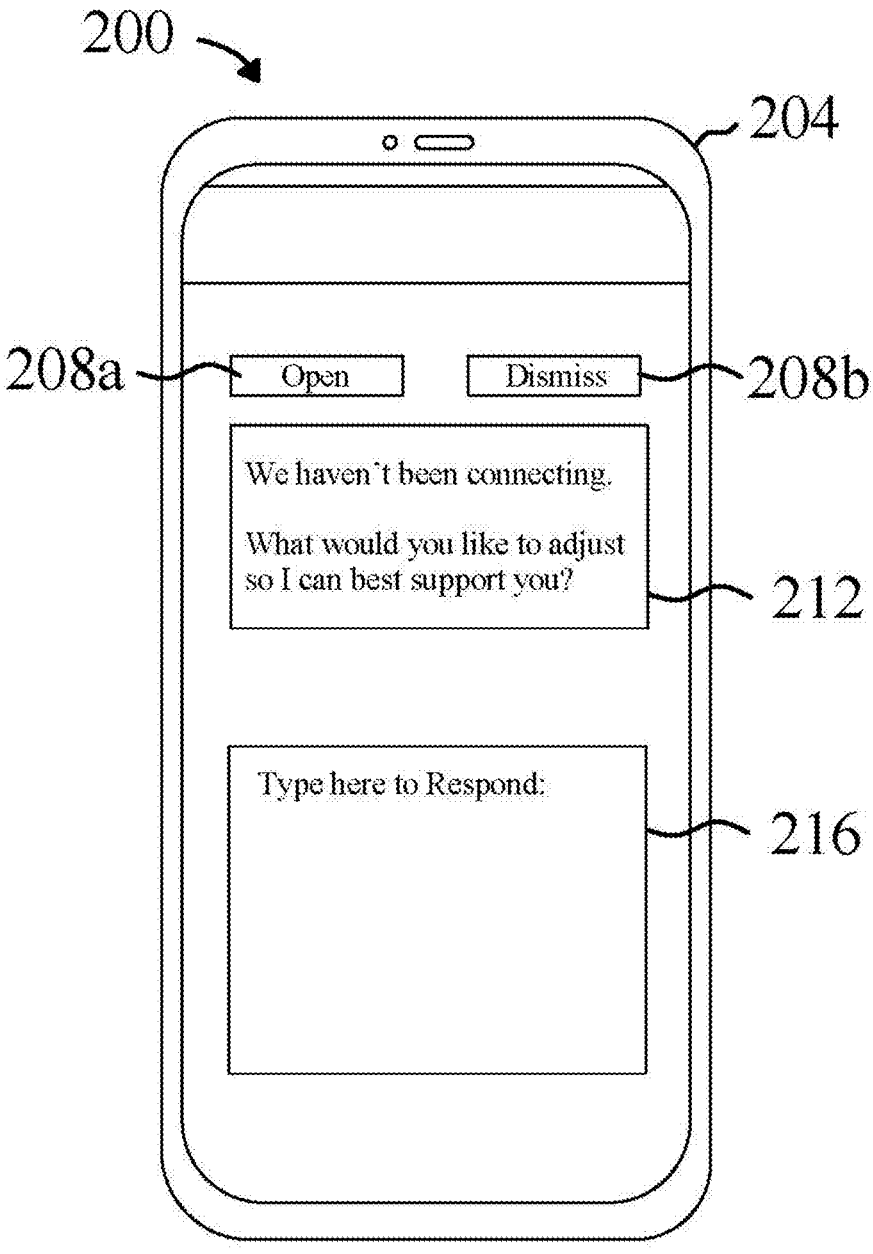
FIG. 2 illustrates an exemplary user interface.

Referring now to FIG. 2, an exemplary user interface 200 is illustrated. The user interface 200 may be presented on a user device 204. As a non-limiting example, user device 204 may include a mobile phone, tablet, or any other downstream device capable of receiving and displaying data. In some cases, user interface 200 may include graphical elements 208a and 208b, which may provide user-selectable options to interact with a device prompt 212. In some embodiments, graphical element 208a may allow a user to open or engage with device prompt 212. In some embodiments, graphical element 208b may allow a user to dismiss device prompt 212. In a non-limiting example, interacting with graphical elements 208b may generate responsiveness metric 146. In some cases, user interface 200 may include a user input field 216. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. In some cases, user input field 216 may allow a user to enter a response to device prompt 212. In some cases, user input field 216 may be treated as user input and may be used by processor to update the user profile, adjust future transmittal parameters, or the like.

Figure 3:
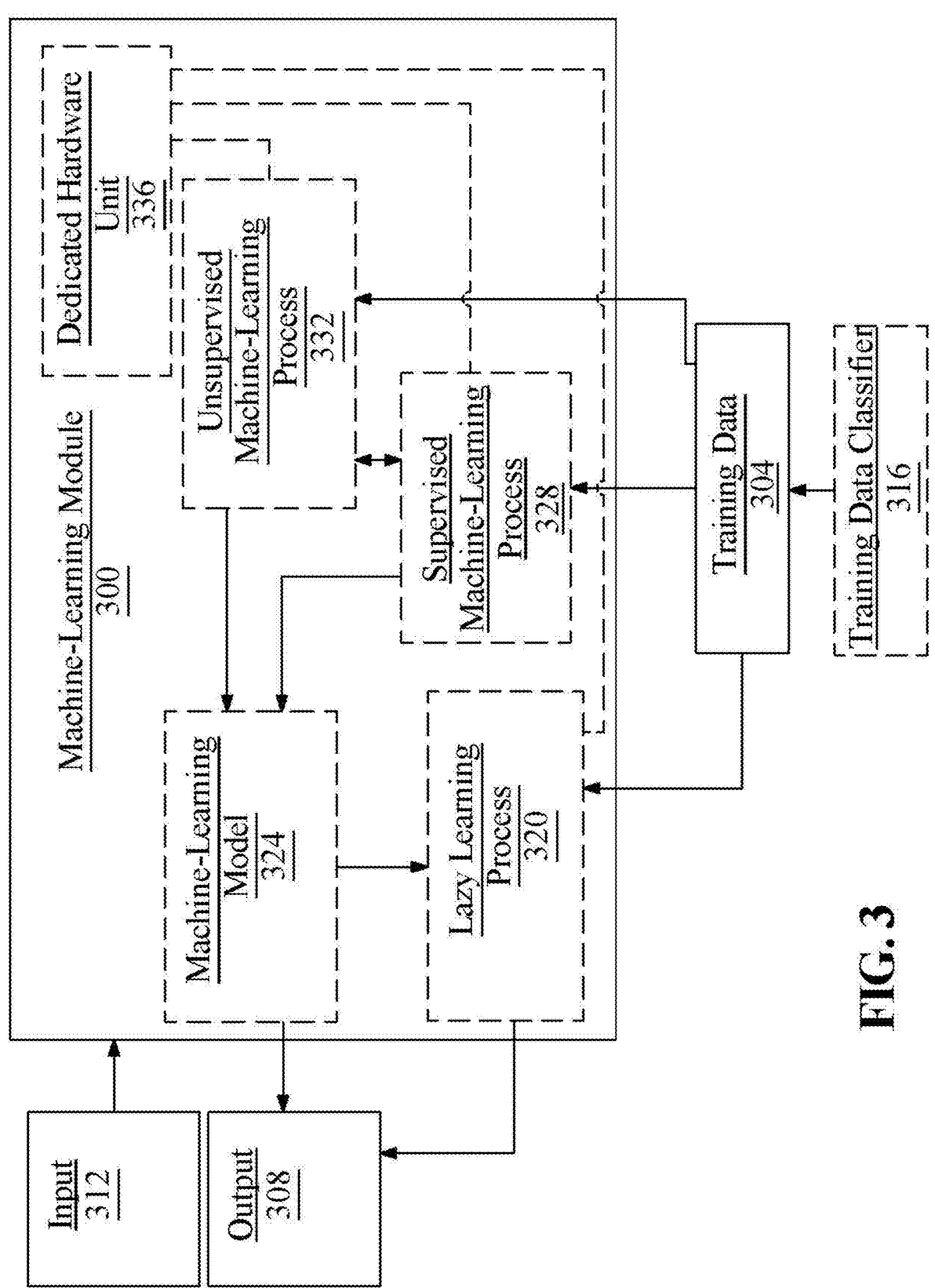
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include user profile, user input, contextual signals, device responsiveness, behavior indicator, external data, alignment deviation, event datum, and the like. As a non-limiting illustrative example, output data may include device prompt 110, device responsiveness 124, transmittal parameter 126, behavior indicator 128, alignment deviation 132, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to user cohort related to user's demographic, field of industry, company information, role, responsibility, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)'P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction.

Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25th percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user profile, user input, contextual signals, device responsiveness, behavior indicator, external data, alignment deviation, event datum, and the like as described above as inputs, device prompt 110, device responsiveness 124, transmittal parameter 126, behavior indicator 128, alignment deviation 132, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
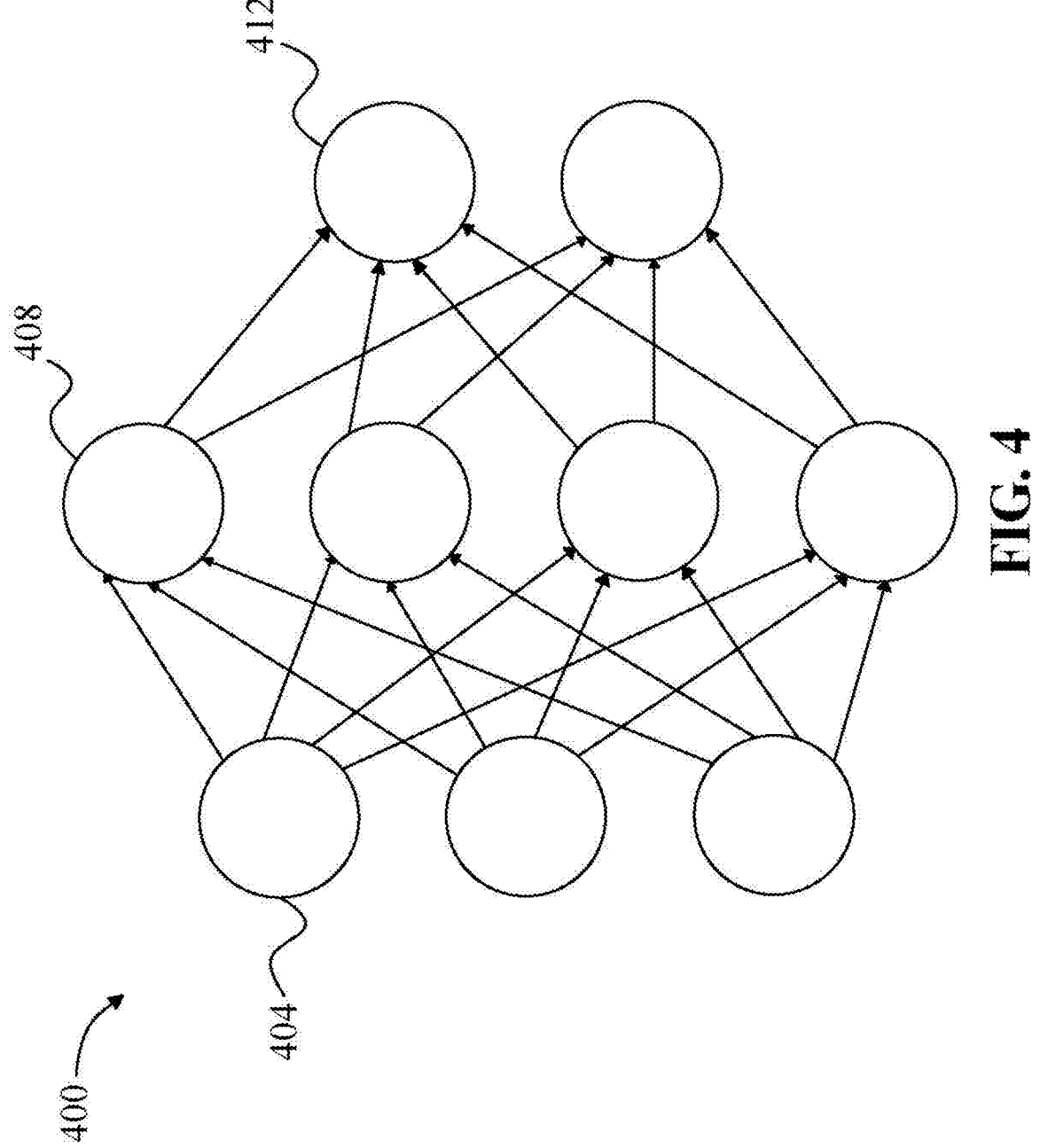
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
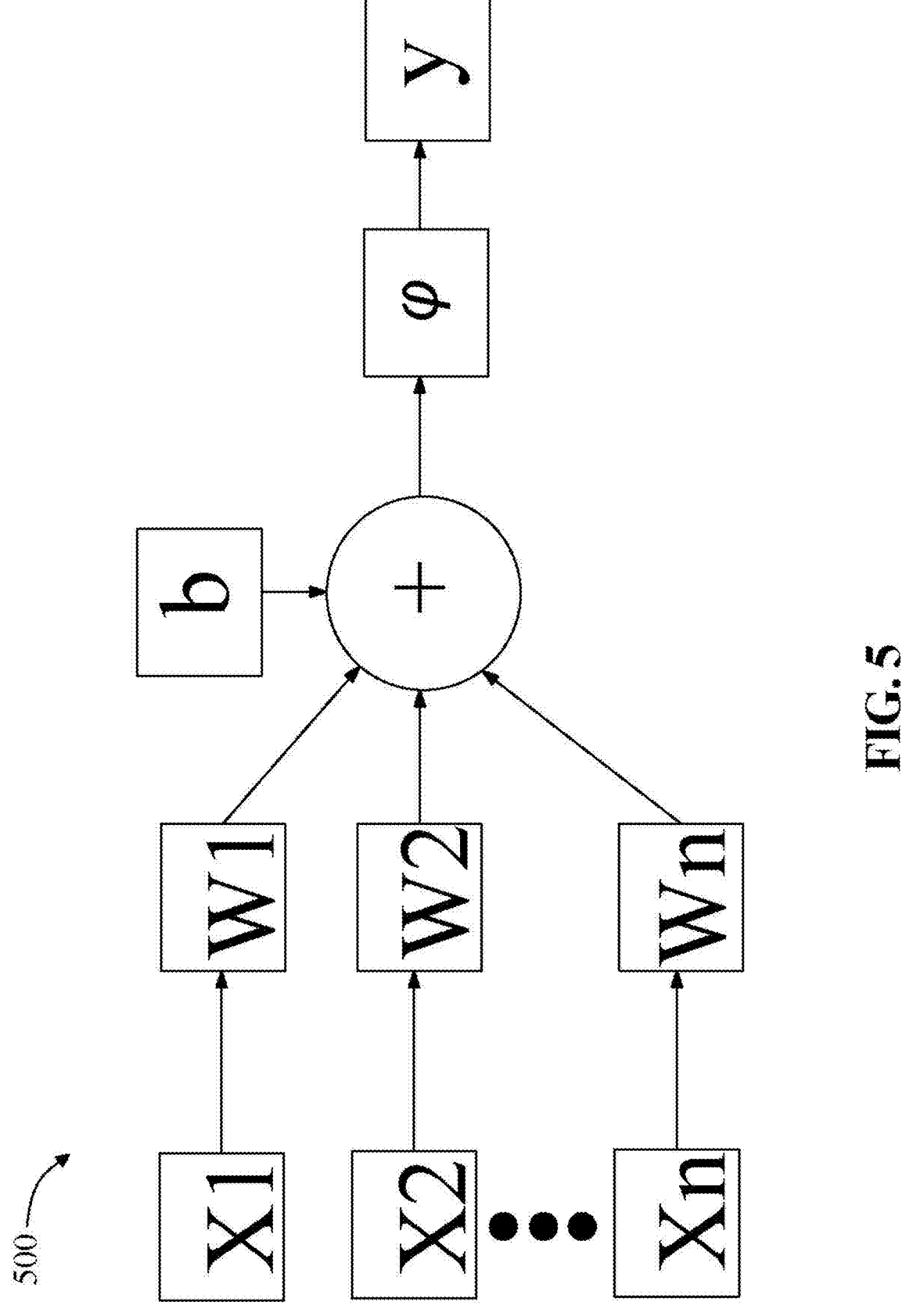
FIG. 5 illustrates a block diagram of an exemplary node in a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, $\alpha$ is a parameter to set the learning rate, and $$\frac{dJ}{dw}$$

is the partial derivative of with respect to weight w.

Figure 6:
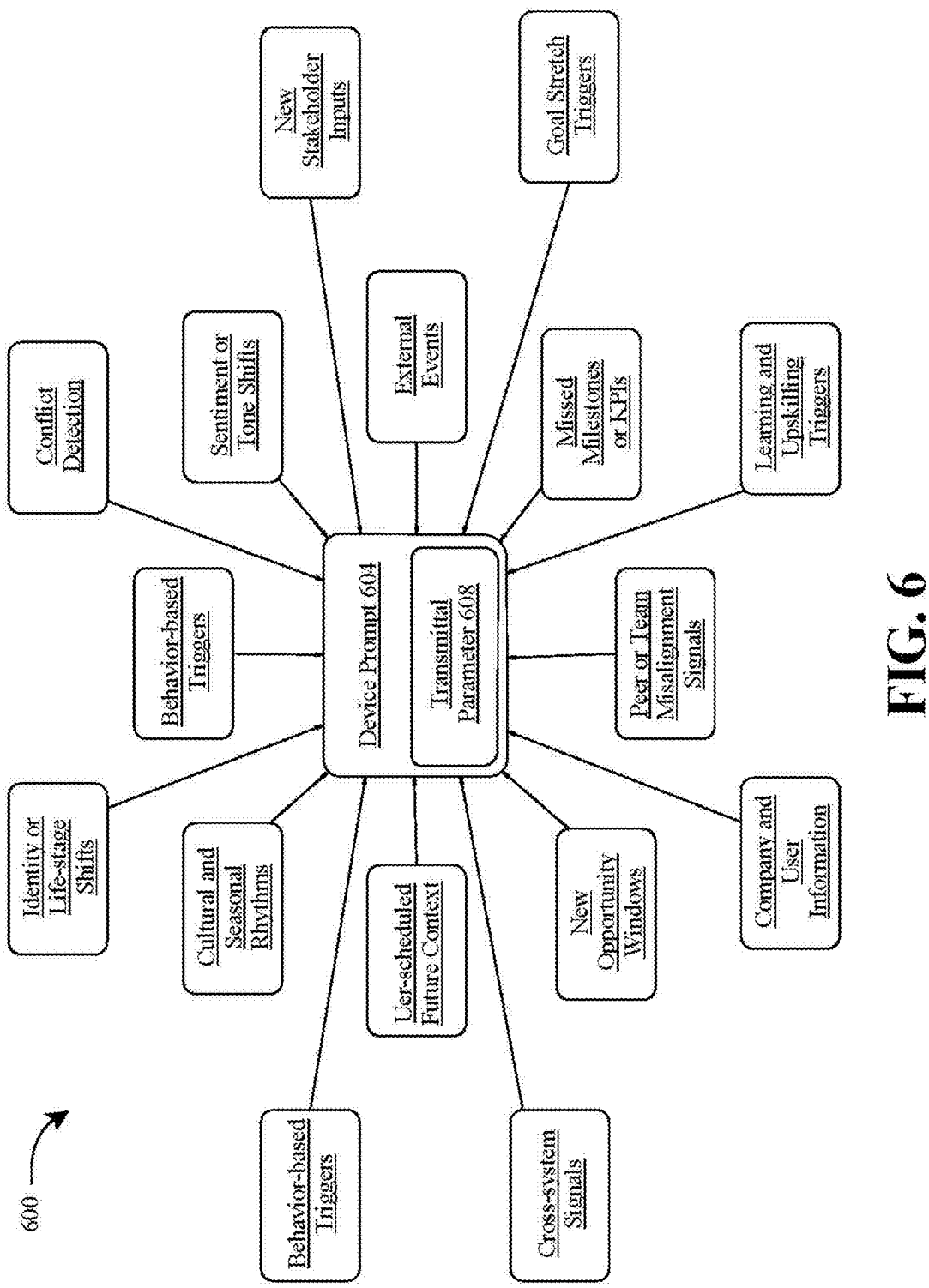
FIG. 6 illustrates a block diagram of exemplary elements that can affect generation of a device prompt and a transmittal parameter of the device prompt.

Referring now to FIG. 6, a block diagram 600 of exemplary elements that can affect generation of device prompt 604 and transmittal parameter 608 of device prompt 604 is illustrated. In some cases, various contextual inputs and signals may be analyzed by a processor to influence both the content and timing of device prompt 604. In some cases, the elements may originate from behavioral, organizational, temporal, and external sources. In some cases, the elements may be used independently or in combination to dynamically modify device prompt 604 and its associated transmittal parameter 608.

With continued reference to FIG. 6, as a non-limiting example, behavior-based triggers may initiate or modify device prompt 604 and/or transmittal parameter 608, such as when a processor detects repeated procrastination, inactivity, or the absence of scheduled focus periods. Identity or life-stage shifts may initiate or modify device prompt 604 and/or transmittal parameter 608, for example when a promotion, organizational restructure, or relocation is identified within the user profile. Cultural and seasonal rhythms may initiate or modify device prompt 604 and/or transmittal parameter 608, such as during quarter-end reviews, fiscal year transitions, or major holiday periods. User-scheduled future context may also influence device prompt 604 and/or transmittal parameter 608, such as when users define a recurring time block for strategic planning or reflection. As another non-limiting example, cross-system signals may initiate or modify device prompt 604 and/or transmittal parameter 608 by referencing events or behaviors observed in tools such as CRM, ERP, or project management platforms. New opportunity windows, such as a recently surfaced partnership or market opening, may also initiate a prompt tailored to emerging strategy. Company and user information, including team structure, role, or business unit, may modify the prompt content or determine the most appropriate timing or delivery channel. Peer or team misalignment signals, including disparities in executional focus or conflicting priorities, may initiate device prompt 604 to support alignment resolution. Missed milestones or KPIs may likewise result in diagnostic or supportive prompts to explore blockers or reprioritization. As another non-limiting example, learning and upskilling triggers may initiate or modify device prompt 604 and/or transmittal parameter 608 when behavioral indicators suggest that the user may benefit from coaching, training, or clarification of goals. Goal stretch triggers may initiate or modify device prompt 604 and/or transmittal parameter 608 for users demonstrating high performance, encouraging pursuit of advanced objectives or expanded responsibilities. New stakeholder inputs, such as the addition of board members, executives, or strategic advisors, may initiate or modify device prompt 604 and/or transmittal parameter 608 to support relationship development, messaging adaptation, or alignment recalibration. As another non-limiting example, external events, including market disruptions, competitor activity, or regulatory changes detected through web crawling or API integration, may initiate or modify device prompt 604 and/or transmittal parameter 608 to ensure strategic responsiveness or situational awareness. Sentiment or tone shifts, such as linguistic indicators of burnout, frustration, or disengagement, may initiate or modify device prompt 604 and/or transmittal parameter 608 by adjusting tone, cadence, or channel of communication. Conflict detection, whether across user goals, team expectations, stakeholder directives, or resource prioritization, may initiate or modify device prompt 604 and/or transmittal parameter 608 to surface underlying misalignments and facilitate resolution or refocusing.

Figure 7:
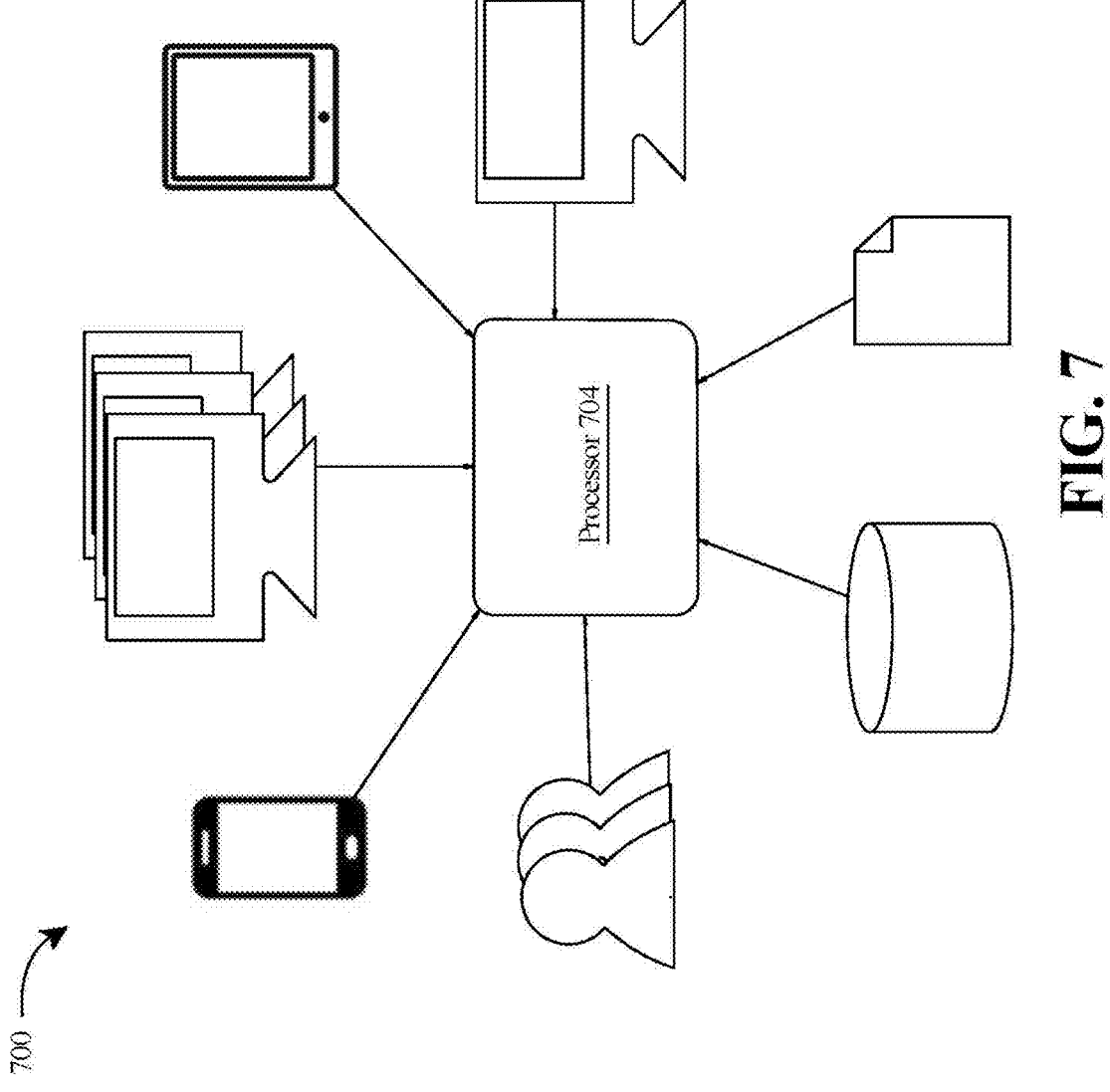
FIG. 7 illustrates a block diagram of exemplary data sources communicatively connected to a processor.

Referring now to FIG. 7, a block diagram 700 of exemplary data sources communicatively connected to processor 704 is illustrated. In some cases, processor 704 may receive data inputs (e.g., user profile, user input, external data, and the like) from a variety of heterogeneous devices, systems, and repositories to enable context-aware prompt generation and transmittal control. In some embodiments, processor 704 may be communicatively connected to a mobile device, such as a smartphone, to receive user input, deliver device prompts, and monitor responsiveness metrics. In some cases, processor 704 may interface with one or more desktop computers or networked workstations. In some cases, processor 704 may receive data from a tablet or other touch-based interface. In some cases, processor 704 may be connected to a server or cloud-based storage system. In some cases, processor 704 may receive inputs from user identity modules, databases, document repositories or content sources.

Figure 8:
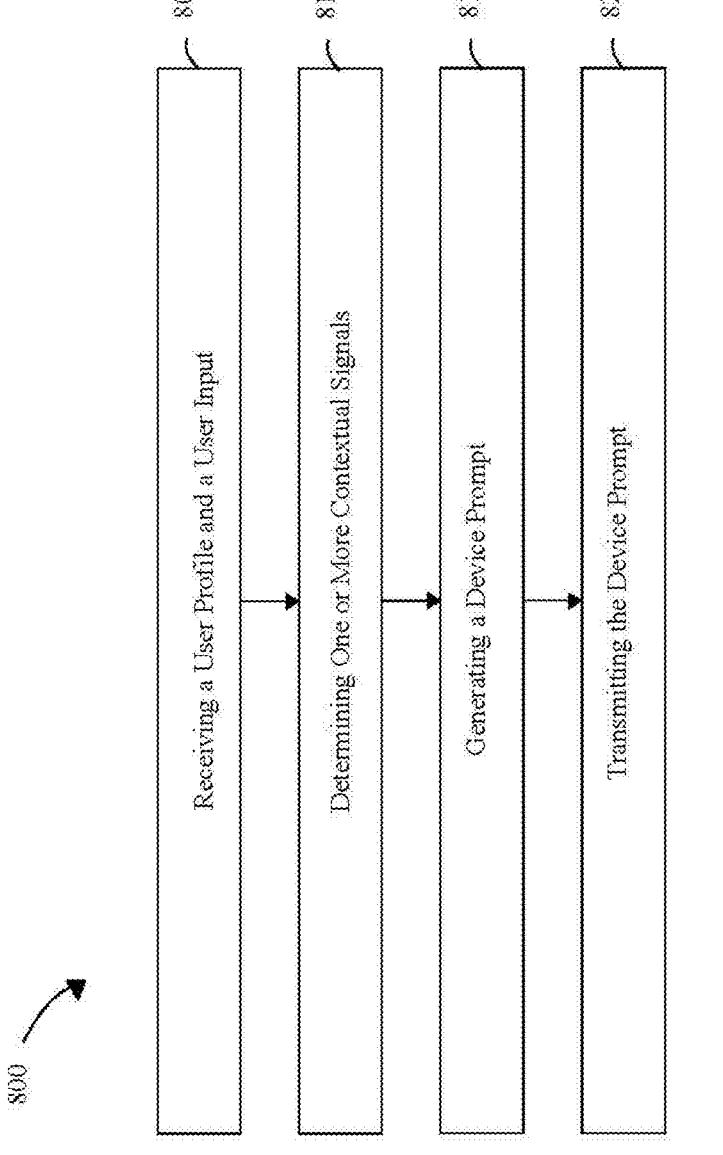
FIG. 8 illustrates a flow diagram of an exemplary method for generating context-aware device prompts and transmission protocols.

Referring now to FIG. 8, a flow diagram of an exemplary method 800 for generating context-aware device prompts and transmission protocols is illustrated. Method 700 contains a step 805 of receiving, using at least a processor, a user profile associated with at least a user and a user input, wherein receiving the user profile and the user input includes receiving the user profile at a first interval from a first data source and receiving the user input at a second interval from a second data source. This may be implemented as reference to FIGS. 1-7.

With continued reference to FIG. 8, method 800 contains a step 810 of determining, using at least a processor, one or more contextual signals as a function of a user profile and a user input. In some embodiments, determining the one or more contextual signals may include extracting one or more user features as a function of the user profile and the user input using a convolutional neural network, and determining one or more behavioral indicators of the one or more contextual signals as a function of the one or more user features. In some embodiments, determining the one or more contextual signals may include retrieving external data from one or more external data sources, and determining the one or more contextual signals as a function of the external data. These may be implemented as reference to FIGS. 1-7.

With continued reference to FIG. 8, method 800 contains a step 815 of generating, using at least a processor, a device prompt as a function of one or more contextual signals. In some embodiments, generating the device prompt may include modifying the device prompt using a large language model to adapt a prompt language to match a preferred persona of the user profile, wherein the large language model has been trained on exemplary device prompts. In some embodiments, generating the device prompt may include detecting an alignment deviation among a plurality of users as a function of the device responsiveness of each of the plurality of users, and generating the device prompt as a function of the alignment deviation. These may be implemented as reference to FIGS. 1-7.

With continued reference to FIG. 8, method 800 contains a step 820 of transmitting, using at least a processor, a device prompt to a downstream device through a first communication channel, wherein transmitting the device prompt includes detecting a device responsiveness of the downstream device and modifying at least a transmittal parameter as a function of the device responsiveness. In some embodiments, transmitting the device prompt may include monitoring communications from the downstream device, detecting a negative responsiveness as a function of a responsiveness threshold, modifying the at least a transmittal parameter to include a second communication channel as a function of the user input and the negative responsiveness, and transmitting the device prompt through the second communication channel. In some embodiments, transmitting the device prompt may include modifying a prompt language of the device prompt as a function of the negative responsiveness, and transmitting the device prompt with the modified prompt language to the downstream device. In some embodiments, transmitting the device prompt may include determining a delivery time of the device prompt as a function of the user profile and the at least a transmittal parameter. In some embodiments, modifying the at least a transmittal parameter may include querying a calendar application programming interface (API) as a function of the user profile, receiving, from the calendar API, a plurality of calendar objects, verifying whether the at least a transmittal parameter overlaps with one or more of the plurality of calendar objects, and modifying the at least a transmittal parameter as a function of the verification. In some embodiments, modifying the at least a transmittal parameter may include receiving a series of responsiveness metrics, determining a response pattern of the downstream device as a function of the series of responsiveness metrics using a pattern classifier that has been trained with pattern training datasets including exemplary responsiveness metrics, and modifying the at least a transmittal parameter as a function of the response pattern. These may be implemented as reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
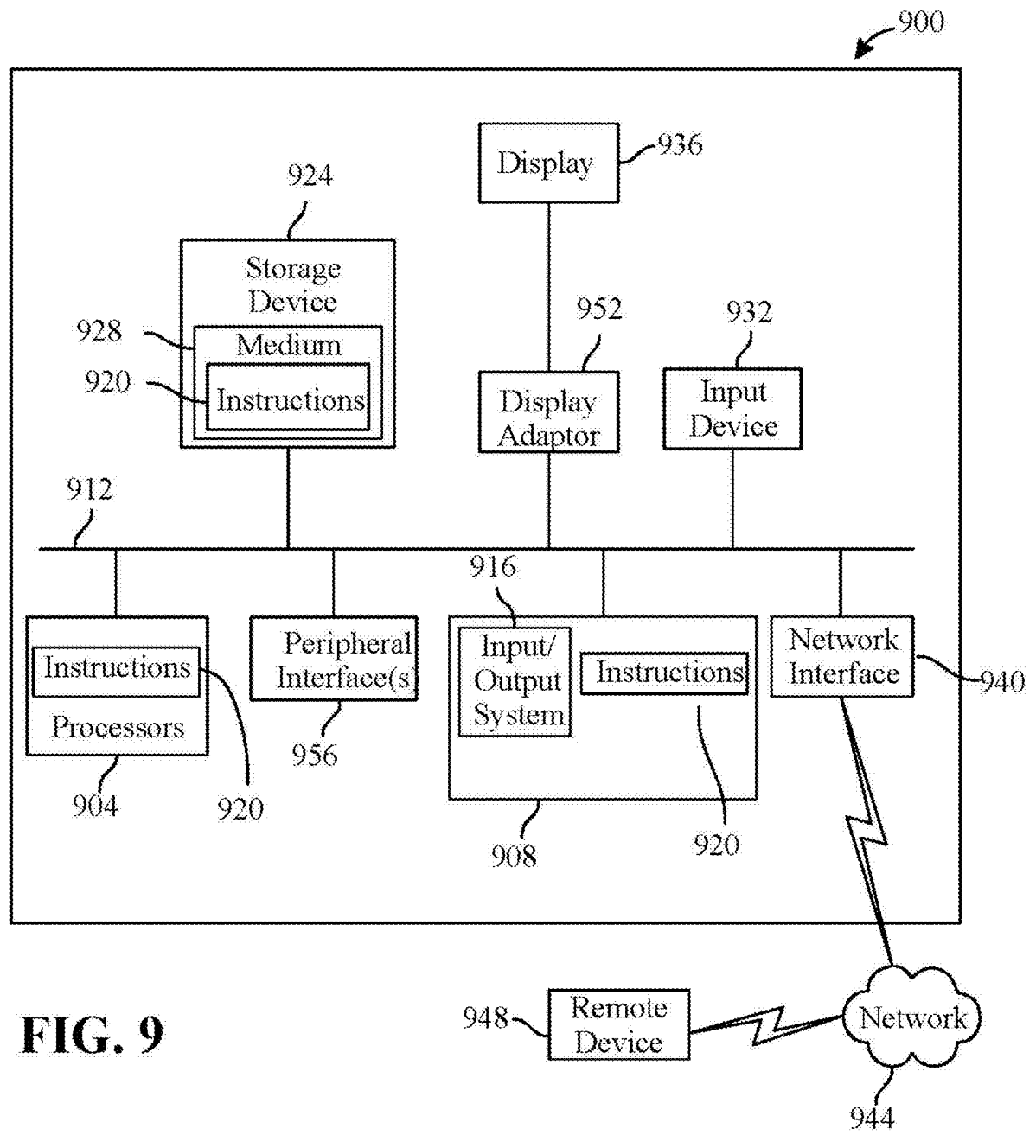
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof. Memory 908 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In some embodiments, storage device

924 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

Further referring to FIG. 9, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 9, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 9, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 900, processor 904, and memory 908 may be virtualized; that is, a virtual machine and/or container may interact directly with such computing system 900, processor 904, and/or memory 908, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 904 comprises a plurality of processors and/or processor cores, virtualization may, in some cases, simulate or emulate a single (virtual) processor whose functions are allocated to one or more of the plurality of processors and/or processor cores. In this case, while processor 904 may be said to be virtualized, the processor 904, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating context-aware device prompts and transmission protocols, the apparatus comprising:

at least a processor; and a memory communicatively connected to the at least a processor, wherein the memory contains instructions configuring the at least a processor to:

receive a user profile associated with at least a user and a user input, wherein receiving the user profile and the user input comprises:

receiving the user profile at a first interval from a first data source; and receiving the user input at a second interval from a second data source;

determine one or more contextual signals as a function of the user profile and the user input;

generate a device prompt as a function of the one or more contextual signals, wherein generating the device prompt comprises:

detecting an alignment deviation among a plurality of users working on a shared goal as a function of:

device responsiveness metrics for each of the plurality of users; and one or more user goals stored in user profiles of the plurality of users, the one or more user goals including at least one of a team goal;

generating the device prompt as a function of the alignment deviation; and transmit the device prompt to a downstream device through a first communication channel, wherein transmitting the device prompt comprises:

detecting a device responsiveness of the downstream device; and modifying at least a transmittal parameter as a function of the device responsiveness.

2. The apparatus of claim 1, wherein transmitting the device prompt comprises:

monitoring communications from the downstream device;

detecting a negative responsiveness as a function of a responsiveness threshold;

modifying the at least a transmittal parameter to comprise a second communication channel as a function of the user input and the negative responsiveness; and transmitting the device prompt through the second communication channel.

3. The apparatus of claim 2, wherein transmitting the device prompt comprises:

modifying a prompt language of the device prompt as a function of the negative responsiveness; and transmitting the device prompt with the modified prompt language to the downstream device.

4. The apparatus of claim 1, wherein determining the one or more contextual signals comprises:

extracting one or more user features as a function of the user profile and the user input using a convolutional neural network; and determining one or more behavioral indicators of the one or more contextual signals as a function of the one or more user features.

5. The apparatus of claim 1, wherein determining the one or more contextual signals comprises:

retrieving external data from one or more external data sources; and determining the one or more contextual signals as a function of the external data.

6. The apparatus of claim 1, wherein generating the device prompt comprises modifying the device prompt using a large language model to adapt a prompt language to match a preferred persona of the user profile, wherein the large language model has been trained on exemplary device prompts.

7. The apparatus of claim 1, wherein transmitting the device prompt comprises determining a delivery time of the device prompt as a function of the user profile and the at least a transmittal parameter.

8. The apparatus of claim 1, wherein modifying the at least a transmittal parameter comprises:

querying a calendar application programming interface (API) as a function of the user profile;

receiving, from the calendar API, a plurality of calendar objects;

verifying whether the at least a transmittal parameter overlaps with one or more of the plurality of calendar objects; and modifying the at least a transmittal parameter as a function of the verification.

9. The apparatus of claim 1, wherein modifying the at least a transmittal parameter comprises:

receiving a series of responsiveness metrics;

determining a response pattern of the downstream device as a function of the series of responsiveness metrics using a pattern classifier that has been trained with pattern training datasets comprising exemplary responsiveness metrics; and modifying the at least a transmittal parameter as a function of the response pattern.

10. A method for generating context-aware device prompts and transmission protocols, the method comprising:

receiving, using at least a processor, a user profile associated with at least a user and a user input, wherein receiving the user profile and the user input comprises:

receiving the user profile at a first interval from a first data source; and receiving the user input at a second interval from a second data source;

determining, using the at least a processor, one or more contextual signals as a function of the user profile and the user input;

generating, using the at least a processor, a device prompt as a function of the one or more contextual signals, wherein generating the device prompt comprises:

detecting an alignment deviation among a plurality of users working on a shared goal as a function of:

device responsiveness metrics for each of the plurality of users; and one or more user goals stored in user profiles of the plurality of users, the one or more user goals including at least one of a team goal;

generating the device prompt as a function of the alignment deviation; and transmitting, using the at least a processor, the device prompt to a downstream device through a first communication channel, wherein transmitting the device prompt comprises:

detecting a device responsiveness of the downstream device; and modifying at least a transmittal parameter as a function of the device responsiveness.

11. The method of claim 10, wherein transmitting the device prompt comprises:

monitoring communications from the downstream device;

detecting a negative responsiveness as a function of a responsiveness threshold;

modifying the at least a transmittal parameter to comprise a second communication channel as a function of the user input and the negative responsiveness; and transmitting the device prompt through the second communication channel.

12. The method of claim 11, wherein transmitting the device prompt comprises:

modifying a prompt language of the device prompt as a function of the negative responsiveness; and transmitting the device prompt with the modified prompt language to the downstream device.

13. The method of claim 10, wherein determining the one or more contextual signals comprises:

extracting one or more user features as a function of the user profile and the user input using a convolutional neural network; and determining one or more behavioral indicators of the one or more contextual signals as a function of the one or more user features.

14. The method of claim 10, wherein determining the one or more contextual signals comprises:

retrieving external data from one or more external data sources; and determining the one or more contextual signals as a function of the external data.

15. The method of claim 10, wherein generating the device prompt comprises modifying the device prompt using a large language model to adapt a prompt language to match a preferred persona of the user profile, wherein the large language model has been trained on exemplary device prompts.

16. The method of claim 10, wherein transmitting the device prompt comprises determining a delivery time of the device prompt as a function of the user profile and the at least a transmittal parameter.

17. The method of claim 10, wherein modifying the at least a transmittal parameter comprises:

querying a calendar application programming interface (API) as a function of the user profile;

receiving, from the calendar API, a plurality of calendar objects;

verifying whether the at least a transmittal parameter overlaps with one or more of the plurality of calendar objects; and modifying the at least a transmittal parameter as a function of the verification.

18. The method of claim 10, wherein modifying the at least a transmittal parameter comprises:

receiving a series of responsiveness metrics;

determining a response pattern of the downstream device as a function of the series of responsiveness metrics using a pattern classifier that has been trained with pattern training datasets comprising exemplary responsiveness metrics; and modifying the at least a transmittal parameter as a function of the response pattern.

\* \* \* \* \*